US010972685B2

(12) United States Patent
Mehdi et al.

(10) Patent No.: US 10,972,685 B2
(45) Date of Patent: Apr. 6, 2021

(54) VIDEO CAMERA ASSEMBLY HAVING AN IR REFLECTOR

(71) Applicant: GOOGLE INC., Mountain View, CA (US)

(72) Inventors: Rafat Mehdi, Mountain View, CA (US); Benjamin Niewood, San Francisco, CA (US); Jason Evans Goulden, Los Gatos, CA (US); Amber Luttmann Volmering, Cupertino, CA (US); Cheng-Jung Lee, San Jose, CA (US); Jeffrey Boyd, Mountain View, CA (US); Adam Scott Kilgore, San Rafael, CA (US)

(73) Assignee: Google LLC, Mountain View, CA (US)

(*) Notice: Subject to any disclaimer, the term of this patent is extended or adjusted under 35 U.S.C. 154(b) by 487 days.

(21) Appl. No.: 15/607,380

(22) Filed: May 26, 2017

(65) Prior Publication Data
US 2018/0343403 A1    Nov. 29, 2018

Related U.S. Application Data

(60) Provisional application No. 62/511,302, filed on May 25, 2017.

(51) Int. Cl.
*H04N 5/33* (2006.01)
*H04N 5/232* (2006.01)
(Continued)

(52) U.S. Cl.
CPC .......... *H04N 5/332* (2013.01); *H04N 5/2254* (2013.01); *H04N 5/2256* (2013.01);
(Continued)

(58) Field of Classification Search
CPC .... H04N 5/332; H04N 5/2254; H04N 5/2256; H04N 5/23245; H04N 5/2351;
(Continued)

(56) References Cited

U.S. PATENT DOCUMENTS

| 1,483,588 A | 2/1924 | Meyers et al. |
| 1,945,956 A | 2/1934 | Rowell |

(Continued)

FOREIGN PATENT DOCUMENTS

| CN | 201203743 | 3/2009 |
| KR | 20080005117 | 11/2008 |

(Continued)

OTHER PUBLICATIONS

Google LLC, International Search Report, PCT/US2018/020900, dated Jul. 2, 2018, 18 pgs.

(Continued)

*Primary Examiner* — Jayanti K Patel
*Assistant Examiner* — Richard B Carter
(74) *Attorney, Agent, or Firm* — Colby Nipper

(57) ABSTRACT

The various implementations described herein include methods, devices, and systems for illuminating and capturing scenes. In one aspect, a video camera assembly includes: (1) one or more processors configured to operate the video camera assembly in a day mode and in a night mode; (2) an image sensor having a field of view of a scene and configured to capture video of a first portion of the scene while in the day mode of operation and in the night mode of operation, the first portion corresponding to the field of view of the image sensor; (3) one or more infrared (IR) illuminators configured to provide illumination during the night mode of operation while the image sensor captures video; and (4) an IR reflector component configured to: (i) substantially restrict the illumination onto the first portion of the (Continued)

scene, and (ii) illuminate the first portion in a substantially uniform manner across the field of view of the image sensor.

20 Claims, 24 Drawing Sheets

(51) Int. Cl.
| | | |
|---|---|---|
| H04N 5/225 | (2006.01) | |
| H04N 5/235 | (2006.01) | |
| H05B 45/00 | (2020.01) | |
| H05B 47/19 | (2020.01) | |
| H04N 7/18 | (2006.01) | |

(52) U.S. Cl.
CPC ......... *H04N 5/2351* (2013.01); *H04N 5/2354* (2013.01); *H04N 5/23245* (2013.01); *H04N 5/33* (2013.01); *H05B 45/00* (2020.01); *H05B 47/19* (2020.01); *H04N 7/181* (2013.01)

(58) Field of Classification Search
CPC ........ H04N 5/2354; H04N 5/33; H04N 7/181; H05B 33/0803; H05B 37/0272
USPC ........... 348/164; 345/175; 351/206; 106/421
See application file for complete search history.

(56) References Cited

U.S. PATENT DOCUMENTS

| | | | |
|---|---|---|---|
| 2,645,511 | A | 7/1953 | Rutledge |
| 2,734,997 | A | 2/1956 | Frady |
| 3,733,042 | A | 5/1973 | Jungjohann et al. |
| 3,748,383 | A | 7/1973 | Grossman |
| 5,464,178 | A | 11/1995 | Grinwald et al. |
| 5,497,306 | A | 3/1996 | Pastrick |
| 5,508,740 | A | 4/1996 | Miyaguchi et al. |
| 5,625,410 | A | 4/1997 | Washino et al. |
| 5,765,485 | A | 6/1998 | Thoman et al. |
| D403,313 | S | 12/1998 | Peppel |
| 6,018,414 | A | 1/2000 | Chipper |
| D424,036 | S | 5/2000 | Arora et al. |
| D456,293 | S | 4/2002 | Tsumura et al. |
| 6,585,201 | B1 | 7/2003 | Reed |
| 6,593,956 | B1 | 7/2003 | Lee et al. |
| D488,818 | S | 4/2004 | Lee et al. |
| D500,047 | S | 12/2004 | Sevedermish |
| 6,948,131 | B1 | 9/2005 | Neven et al. |
| 6,954,498 | B1 | 10/2005 | Lipton |
| D550,227 | S | 9/2007 | Sato et al. |
| 7,382,244 | B1 | 6/2008 | Donovan et al. |
| D590,416 | S | 4/2009 | Kochackis |
| D597,864 | S | 8/2009 | Sakuma et al. |
| D607,004 | S | 12/2009 | Kordus et al. |
| D619,612 | S | 7/2010 | Pueyo et al. |
| D621,730 | S | 8/2010 | Driver et al. |
| D626,131 | S | 10/2010 | Kruzeniski et al. |
| 7,877,708 | B2 | 1/2011 | Zinn et al. |
| 7,884,855 | B2 | 2/2011 | Ortiz |
| 7,903,115 | B2 | 3/2011 | Platzer et al. |
| 7,996,771 | B2 | 8/2011 | Girgensohn |
| D647,809 | S | 11/2011 | Driver |
| D656,157 | S | 3/2012 | Khan et al. |
| D658,674 | S | 5/2012 | Shallcross et al. |
| 8,184,069 | B1 | 5/2012 | Rhodes |
| D661,701 | S | 6/2012 | Brown et al. |
| D662,508 | S | 6/2012 | Kim |
| D664,966 | S | 8/2012 | Shallcross et al. |
| D664,978 | S | 8/2012 | Tanghe et al. |
| D672,364 | S | 12/2012 | Reyna et al. |
| 8,340,654 | B2 | 12/2012 | Bratton et al. |
| D677,269 | S | 3/2013 | Scott et al. |
| D678,898 | S | 3/2013 | Walsh et al. |
| 8,390,684 | B2 | 3/2013 | Piran et al. |
| D681,653 | S | 5/2013 | Bitran et al. |
| D681,660 | S | 5/2013 | Matas |
| D684,164 | S | 6/2013 | Friedlander et al. |
| D686,221 | S | 7/2013 | Brinda et al. |
| D686,635 | S | 7/2013 | Cranfill et al. |
| D689,892 | S | 9/2013 | Perry et al. |
| D689,895 | S | 9/2013 | DeLuca |
| D692,450 | S | 10/2013 | Convay et al. |
| D694,255 | S | 11/2013 | Jones, Jr. |
| 8,589,374 | B2 | 11/2013 | Chaudhri |
| D696,677 | S | 12/2013 | Corcoran et al. |
| 8,615,511 | B2 | 12/2013 | Jones |
| D697,930 | S | 1/2014 | Crabtree et al. |
| D697,940 | S | 1/2014 | Bitran et al. |
| 8,665,375 | B2 | 3/2014 | Moore et al. |
| D702,700 | S | 4/2014 | Thomspon |
| D702,704 | S | 4/2014 | Santos et al. |
| D705,255 | S | 5/2014 | Gerssen et al. |
| D707,245 | S | 6/2014 | Bruck et al. |
| D708,197 | S | 7/2014 | Pasceri et al. |
| D708,204 | S | 7/2014 | Pasceri et al. |
| D711,415 | S | 8/2014 | Simister et al. |
| D712,928 | S | 9/2014 | Brener et al. |
| D714,334 | S | 9/2014 | Cojuangco et al. |
| 8,830,193 | B2 | 9/2014 | Shah |
| 8,843,239 | B2 | 9/2014 | Migdoll et al. |
| D715,835 | S | 10/2014 | Montgomery et al. |
| D716,334 | S | 10/2014 | Lee et al. |
| D717,809 | S | 11/2014 | Tsuru et al. |
| D717,823 | S | 11/2014 | Brotman et al. |
| 8,917,274 | B2 | 12/2014 | Ma et al. |
| D720,765 | S | 1/2015 | Xie et al. |
| D720,766 | S | 1/2015 | Mandal et al. |
| D721,382 | S | 1/2015 | Brinda et al. |
| D723,576 | S | 3/2015 | Jones |
| D724,603 | S | 3/2015 | Williams et al. |
| D725,666 | S | 3/2015 | Tseng et al. |
| 8,984,436 | B1 | 3/2015 | Tseng et al. |
| 8,988,232 | B1 | 3/2015 | Sloo et al. |
| D726,735 | S | 4/2015 | Asai |
| D727,336 | S | 4/2015 | Allison et al. |
| D727,928 | S | 4/2015 | Allison et al. |
| D736,223 | S | 8/2015 | Park |
| D736,792 | S | 8/2015 | Brinda et al. |
| D737,131 | S | 8/2015 | Frandsen |
| D737,278 | S | 8/2015 | Shin et al. |
| D737,283 | S | 8/2015 | Scalisi |
| D739,429 | S | 9/2015 | Veilleux et al. |
| D739,864 | S | 9/2015 | Kang |
| 9,140,572 | B2 | 9/2015 | Millington |
| D740,300 | S | 10/2015 | Lee et al. |
| 9,158,974 | B1 | 10/2015 | Laska et al. |
| 9,170,707 | B1 | 10/2015 | Laska et al. |
| D745,527 | S | 12/2015 | Wang |
| D746,828 | S | 1/2016 | Arai et al. |
| D746,849 | S | 1/2016 | Anzures et al. |
| D747,333 | S | 1/2016 | Supino et al. |
| D748,666 | S | 2/2016 | Heeter et al. |
| D749,620 | S | 2/2016 | Jones |
| D751,090 | S | 3/2016 | Hu et al. |
| D752,061 | S | 3/2016 | Ahn et al. |
| D752,072 | S | 3/2016 | Song |
| D752,107 | S | 3/2016 | Yun |
| D752,605 | S | 3/2016 | Wang et al. |
| D753,132 | S | 4/2016 | Cuthbert et al. |
| D753,151 | S | 4/2016 | Lee et al. |
| D753,703 | S | 4/2016 | Villamor et al. |
| D753,708 | S | 4/2016 | Yang et al. |
| D754,713 | S | 4/2016 | Zhang et al. |
| D754,714 | S | 4/2016 | Zhang et al. |
| D755,193 | S | 5/2016 | Sun et al. |
| D756,379 | S | 5/2016 | Apodaca et al. |
| D756,401 | S | 5/2016 | Soldner et al. |
| D757,090 | S | 5/2016 | Myung |
| D757,746 | S | 5/2016 | Lee |
| D757,747 | S | 5/2016 | Butcher et al. |
| D757,784 | S | 5/2016 | Lee et al. |
| D758,386 | S | 6/2016 | Zhang et al. |
| D758,422 | S | 6/2016 | Zhao |
| D759,688 | S | 6/2016 | Wu |
| 9,361,011 | B1 | 6/2016 | Burns |

(56) References Cited

U.S. PATENT DOCUMENTS

| | | |
|---|---|---|
| D760,769 S | 7/2016 | Ishii et al. |
| D760,792 S | 7/2016 | Liu et al. |
| D761,277 S | 7/2016 | Harvell |
| 9,386,230 B1 * | 7/2016 | Duran .................. H04N 5/2351 |
| D762,655 S | 8/2016 | Kai |
| D763,271 S | 8/2016 | Everette et al. |
| D763,306 S | 8/2016 | Lee et al. |
| D763,308 S | 8/2016 | Wang et al. |
| D763,869 S | 8/2016 | Wang et al. |
| D763,888 S | 8/2016 | Patel |
| D763,895 S | 8/2016 | Chaudhri et al. |
| 9,417,637 B2 | 8/2016 | Matsuoka et al. |
| D765,674 S | 9/2016 | Kim |
| D765,678 S | 9/2016 | Goux |
| D766,958 S | 9/2016 | Salazar Cardozo et al. |
| 9,454,820 B1 | 9/2016 | Kirmani |
| D768,687 S | 10/2016 | Bae et al. |
| D769,897 S | 10/2016 | Li |
| D769,930 S | 10/2016 | Agrawal |
| 9,471,452 B2 | 10/2016 | Mcelhinney et al. |
| D770,517 S | 11/2016 | Peng et al. |
| D771,645 S | 11/2016 | Jewitt et al. |
| D772,257 S | 11/2016 | Furutani et al. |
| D772,894 S | 11/2016 | Zhao et al. |
| D773,531 S | 12/2016 | Toth et al. |
| D775,165 S | 12/2016 | Sun et al. |
| 9,513,642 B2 | 12/2016 | Rogers et al. |
| D775,658 S | 1/2017 | Luo et al. |
| D776,126 S | 1/2017 | Lai et al. |
| D776,130 S | 1/2017 | Contreras et al. |
| D776,680 S | 1/2017 | Bae et al. |
| D776,690 S | 1/2017 | Tsujimoto et al. |
| D776,702 S | 1/2017 | Huang et al. |
| D777,744 S | 1/2017 | Wang et al. |
| D779,504 S | 2/2017 | Cabrera et al. |
| D779,533 S | 2/2017 | Liu |
| D780,785 S | 3/2017 | Hansen et al. |
| D781,299 S | 3/2017 | Yun et al. |
| 9,591,215 B1 | 3/2017 | Miller et al. |
| D783,641 S | 4/2017 | Elston et al. |
| D783,652 S | 4/2017 | Guan et al. |
| D784,363 S | 4/2017 | Fleming et al. |
| D784,400 S | 4/2017 | Joi |
| 9,619,984 B2 | 4/2017 | Donovan et al. |
| D786,932 S | 5/2017 | Kim et al. |
| 9,660,122 B2 | 5/2017 | Tan |
| D790,581 S | 6/2017 | Chaudhri et al. |
| D791,806 S | 7/2017 | Brewington et al. |
| D794,047 S | 8/2017 | Gandhi et al. |
| D795,292 S | 8/2017 | Loosli et al. |
| D795,919 S | 8/2017 | Bischoff et al. |
| D795,927 S | 8/2017 | Bischoff et al. |
| D796,535 S | 9/2017 | Gaur et al. |
| D796,540 S | 9/2017 | McLean et al. |
| D797,131 S | 9/2017 | Mizono et al. |
| D797,772 S | 9/2017 | Mizono et al. |
| D800,747 S | 10/2017 | Lee et al. |
| D800,752 S | 10/2017 | Hersh et al. |
| 9,778,830 B1 | 10/2017 | Dubin |
| D803,233 S | 11/2017 | Wilberding |
| D803,241 S | 11/2017 | Mizono et al. |
| D803,242 S | 11/2017 | Mizono et al. |
| D805,548 S | 12/2017 | King et al. |
| D806,114 S | 12/2017 | Kim et al. |
| 9,838,602 B2 | 12/2017 | Duran et al. |
| D807,376 S | 1/2018 | Mizono et al. |
| D809,522 S | 2/2018 | Mizono et al. |
| D810,116 S | 2/2018 | McLean et al. |
| 9,898,175 B2 | 2/2018 | Fiedler |
| D815,144 S | 4/2018 | Feng et al. |
| D817,337 S | 5/2018 | Wei |
| D817,357 S | 5/2018 | Barajas et al. |
| D818,000 S | 5/2018 | Lee et al. |
| D819,047 S | 5/2018 | Bates et al. |
| D819,075 S | 5/2018 | Tsuji et al. |
| 9,979,862 B1 | 5/2018 | Xiong et al. |
| D821,407 S | 6/2018 | Wilberding |
| D821,410 S | 6/2018 | Vinna et al. |
| D821,441 S | 6/2018 | Wilberding et al. |
| D821,443 S | 6/2018 | Jang et al. |
| D823,867 S | 7/2018 | Berlow |
| D823,891 S | 7/2018 | Lupei et al. |
| D824,416 S | 7/2018 | Memmelaar et al. |
| D824,926 S | 8/2018 | De La Garza |
| D831,673 S | 10/2018 | O'Rourke et al. |
| 10,091,020 B2 | 10/2018 | Han et al. |
| 10,133,443 B2 | 11/2018 | Von Dehsen et al. |
| 10,145,577 B2 | 12/2018 | Bruck et al. |
| 10,156,959 B2 | 12/2018 | Fulker et al. |
| D837,237 S | 1/2019 | Fraser et al. |
| D841,659 S | 2/2019 | Mehta et al. |
| D842,867 S | 3/2019 | Jedrzejowicz et al. |
| D842,874 S | 3/2019 | Tashiro et al. |
| D842,891 S | 3/2019 | MacLean et al. |
| D843,398 S | 3/2019 | Stewart et al. |
| D844,668 S | 4/2019 | Lee et al. |
| D849,030 S | 5/2019 | Shook et al. |
| 10,281,507 B2 | 5/2019 | Schuh et al. |
| 10,352,496 B2 | 7/2019 | Mehdi et al. |
| 10,353,576 B2 | 7/2019 | Coffman et al. |
| 10,386,999 B2 | 8/2019 | Burns et al. |
| D868,797 S | 12/2019 | Blum et al. |
| 10,683,962 B2 | 6/2020 | Raghupathy et al. |
| 10,819,921 B2 | 10/2020 | Roth et al. |
| 2002/0049979 A1 | 4/2002 | White et al. |
| 2002/0116120 A1 | 8/2002 | Ruiz et al. |
| 2003/0214733 A1 | 11/2003 | Fujikawa et al. |
| 2004/0113770 A1 | 6/2004 | Falk et al. |
| 2004/0177149 A1 | 9/2004 | Zullo et al. |
| 2004/0260427 A1 | 12/2004 | Wimsatt |
| 2005/0046723 A1 | 3/2005 | Bean et al. |
| 2005/0082480 A1 | 4/2005 | Wagner et al. |
| 2005/0104958 A1 | 5/2005 | Egnal et al. |
| 2005/0289615 A1 | 12/2005 | Nishitani |
| 2006/0288392 A1 | 12/2006 | Fleming |
| 2007/0024706 A1 | 2/2007 | Brannon |
| 2007/0025688 A1 | 2/2007 | Pejhan |
| 2007/0033632 A1 | 2/2007 | Baynger et al. |
| 2008/0088706 A1 | 4/2008 | Girgensohn et al. |
| 2008/0174570 A1 | 7/2008 | Jobs et al. |
| 2008/0181498 A1 | 7/2008 | Swenson et al. |
| 2008/0263468 A1 | 10/2008 | Cappione et al. |
| 2008/0266445 A1 | 10/2008 | Park Min |
| 2009/0002157 A1 | 1/2009 | Donavan et al. |
| 2009/0002492 A1 | 1/2009 | Velipasalar et al. |
| 2009/0021583 A1 | 1/2009 | Salgar et al. |
| 2009/0075694 A1 | 3/2009 | Kim et al. |
| 2009/0164439 A1 | 6/2009 | Nevins |
| 2009/0178007 A1 | 7/2009 | Matas et al. |
| 2009/0220206 A1 | 9/2009 | Kisliakov |
| 2009/0284601 A1 | 11/2009 | Eledath |
| 2009/0288011 A1 | 11/2009 | Piran et al. |
| 2010/0023865 A1 | 1/2010 | Fulker et al. |
| 2010/0061446 A1 | 3/2010 | Hands et al. |
| 2010/0079591 A1 | 4/2010 | Lee |
| 2010/0124274 A1 | 5/2010 | Cheok et al. |
| 2010/0131457 A1 | 5/2010 | Heimendinger |
| 2010/0206999 A1 | 8/2010 | Li et al. |
| 2010/0321183 A1 | 12/2010 | Donovan et al. |
| 2011/0040760 A1 | 2/2011 | Fleishman et al. |
| 2011/0090457 A1 * | 4/2011 | Shikaumi ................ A61B 3/14 351/206 |
| 2011/0185269 A1 | 7/2011 | Finkelstein et al. |
| 2011/0199517 A1 | 8/2011 | Laberge |
| 2011/0205435 A1 | 8/2011 | Lee et al. |
| 2011/0316697 A1 | 12/2011 | Krahnstoever et al. |
| 2012/0026337 A1 | 2/2012 | Boulanger et al. |
| 2012/0036480 A1 | 2/2012 | Warner et al. |
| 2012/0066608 A1 | 3/2012 | Sundermeyer et al. |
| 2012/0130513 A1 | 5/2012 | Hao et al. |
| 2012/0273630 A1 | 11/2012 | Gillespie-Brown et al. |
| 2012/0280941 A1 * | 11/2012 | Hu ........................ G03B 33/12 345/175 |
| 2012/0317299 A1 | 12/2012 | Sathianathan et al. |

(56) References Cited

U.S. PATENT DOCUMENTS

| | | |
|---|---|---|
| 2012/0323930 A1 | 12/2012 | Kennberg et al. |
| 2013/0016122 A1 | 1/2013 | Bhatt et al. |
| 2013/0048837 A1 | 2/2013 | Pope et al. |
| 2013/0067365 A1 | 3/2013 | Shrufi et al. |
| 2013/0072308 A1 | 3/2013 | Peck et al. |
| 2013/0083184 A1 | 4/2013 | Yogesan |
| 2013/0089231 A1 | 4/2013 | Wilk et al. |
| 2013/0090767 A1 | 4/2013 | Bruck et al. |
| 2013/0091432 A1 | 4/2013 | Shet et al. |
| 2013/0129307 A1 | 5/2013 | Choe et al. |
| 2013/0132908 A1 | 5/2013 | Lee et al. |
| 2013/0145270 A1 | 6/2013 | Piran et al. |
| 2013/0173064 A1 | 7/2013 | Fadell et al. |
| 2013/0179836 A1 | 7/2013 | Han et al. |
| 2013/0185150 A1 | 7/2013 | Crum |
| 2013/0211783 A1 | 8/2013 | Fisher et al. |
| 2013/0251150 A1 | 9/2013 | Chassagne |
| 2013/0263034 A1 | 10/2013 | Bruck et al. |
| 2013/0268129 A1 | 10/2013 | Fadell et al. |
| 2013/0282421 A1 | 10/2013 | Graff et al. |
| 2013/0311909 A1 | 11/2013 | Howard et al. |
| 2013/0325332 A1 | 12/2013 | Rhee et al. |
| 2013/0328997 A1 | 12/2013 | Desi |
| 2013/0332886 A1 | 12/2013 | Cranfill et al. |
| 2014/0012574 A1 | 1/2014 | Pasupalak et al. |
| 2014/0013243 A1 | 1/2014 | Flynn, III et al. |
| 2014/0026061 A1 | 1/2014 | Kim et al. |
| 2014/0033071 A1 | 1/2014 | Gruber et al. |
| 2014/0043485 A1 | 2/2014 | Bateman et al. |
| 2014/0050455 A1 | 2/2014 | Ni et al. |
| 2014/0064738 A1 | 3/2014 | Chen et al. |
| 2014/0098247 A1 | 4/2014 | Rao et al. |
| 2014/0189518 A1 | 7/2014 | Kim et al. |
| 2014/0189586 A1 | 7/2014 | Waldman et al. |
| 2014/0218517 A1 | 8/2014 | Kim et al. |
| 2014/0222424 A1 | 8/2014 | Hartford et al. |
| 2014/0232873 A1 | 8/2014 | Meganathan |
| 2014/0277795 A1 | 9/2014 | Matsuoka et al. |
| 2014/0313377 A1 | 10/2014 | Hampton |
| 2014/0333530 A1 | 11/2014 | Agnetta |
| 2014/0333776 A1 | 11/2014 | Dedeoglu |
| 2014/0365019 A1 | 12/2014 | Gourlay et al. |
| 2014/0375819 A1 | 12/2014 | Larsen et al. |
| 2015/0023650 A1 | 1/2015 | Austin et al. |
| 2015/0035987 A1 | 2/2015 | Fernandez |
| 2015/0049243 A1 | 2/2015 | Samuels et al. |
| 2015/0058709 A1 | 2/2015 | Zaletel |
| 2015/0058730 A1 | 2/2015 | Dubin et al. |
| 2015/0097689 A1 | 4/2015 | Logue et al. |
| 2015/0113432 A1 | 4/2015 | Jung et al. |
| 2015/0113461 A1 | 4/2015 | Kasten et al. |
| 2015/0117513 A1 | 4/2015 | Sarafa et al. |
| 2015/0143239 A1 | 5/2015 | Birkbeck et al. |
| 2015/0173846 A1 | 6/2015 | Schneider et al. |
| 2015/0193127 A1 | 7/2015 | Chai et al. |
| 2015/0208205 A1 | 7/2015 | Chan et al. |
| 2015/0227196 A1 | 8/2015 | Fujii et al. |
| 2015/0242404 A1 | 8/2015 | Underwood, IV et al. |
| 2015/0248270 A1 | 9/2015 | Lang |
| 2015/0248275 A1 | 9/2015 | Gallo et al. |
| 2015/0269643 A1 | 9/2015 | Riley et al. |
| 2015/0287310 A1 | 10/2015 | Deiiuliis et al. |
| 2015/0310280 A1 | 10/2015 | Bentley et al. |
| 2015/0350265 A1 | 12/2015 | O'Brien |
| 2015/0350611 A1 | 12/2015 | Pearson et al. |
| 2016/0004390 A1 | 1/2016 | Laska et al. |
| 2016/0026329 A1 | 1/2016 | Fadell et al. |
| 2016/0034574 A1 | 2/2016 | Kang |
| 2016/0041724 A1 | 2/2016 | Kirkby et al. |
| 2016/0043905 A1 | 2/2016 | Fiedler |
| 2016/0054175 A1 | 2/2016 | Jia et al. |
| 2016/0086038 A1 | 3/2016 | Scanlon et al. |
| 2016/0088326 A1 | 3/2016 | Solomon et al. |
| 2016/0092720 A1 | 3/2016 | Lee et al. |
| 2016/0105331 A1 | 4/2016 | Han et al. |
| 2016/0105747 A1 | 4/2016 | Cheng |
| 2016/0105847 A1 | 4/2016 | Smith et al. |
| 2016/0110064 A1 | 4/2016 | Shapira |
| 2016/0139671 A1 | 5/2016 | Jun et al. |
| 2016/0139747 A1 | 5/2016 | Kocienda et al. |
| 2016/0147406 A1 | 5/2016 | Yi |
| 2016/0155315 A1 | 6/2016 | McElhinney et al. |
| 2016/0205318 A1 | 7/2016 | Wang et al. |
| 2016/0220743 A1 | 8/2016 | Guthrie et al. |
| 2016/0260414 A1 | 9/2016 | Yang |
| 2016/0306509 A1 | 10/2016 | Jeon et al. |
| 2016/0320875 A1* | 11/2016 | Yoshida .................. G06F 3/042 |
| 2016/0335139 A1 | 11/2016 | Hurley et al. |
| 2016/0349936 A1 | 12/2016 | Cho et al. |
| 2016/0353531 A1 | 12/2016 | Conner |
| 2016/0358436 A1 | 12/2016 | Wautier et al. |
| 2016/0364114 A1 | 12/2016 | Von Dehsen et al. |
| 2016/0366330 A1 | 12/2016 | Boliek et al. |
| 2017/0003720 A1 | 1/2017 | Robinson et al. |
| 2017/0010790 A1 | 1/2017 | Glover et al. |
| 2017/0017376 A1 | 1/2017 | Han et al. |
| 2017/0017384 A1 | 1/2017 | Lee |
| 2017/0017392 A1 | 1/2017 | Castaneda et al. |
| 2017/0034430 A1 | 2/2017 | Fu et al. |
| 2017/0060374 A1 | 3/2017 | Murrells et al. |
| 2017/0060399 A1 | 3/2017 | Hough et al. |
| 2017/0089739 A1 | 3/2017 | Gallo |
| 2017/0126975 A1 | 5/2017 | Duran et al. |
| 2017/0140221 A1 | 5/2017 | Ollila et al. |
| 2017/0168374 A1 | 6/2017 | Lin et al. |
| 2017/0186079 A1 | 6/2017 | Kim et al. |
| 2017/0201850 A1 | 7/2017 | Raleigh et al. |
| 2017/0207949 A1 | 7/2017 | Donaovan et al. |
| 2017/0286913 A1 | 10/2017 | Liu et al. |
| 2017/0308390 A1 | 10/2017 | Venis et al. |
| 2017/0329511 A1 | 11/2017 | Ueno et al. |
| 2017/0336920 A1 | 11/2017 | Chan et al. |
| 2017/0357439 A1 | 12/2017 | Lemay et al. |
| 2018/0013934 A1 | 1/2018 | Germe et al. |
| 2018/0018081 A1 | 1/2018 | Dattilo-Green et al. |
| 2018/0019889 A1 | 1/2018 | Burns et al. |
| 2018/0048819 A1 | 2/2018 | Duran et al. |
| 2018/0101297 A1 | 4/2018 | Yang et al. |
| 2018/0113577 A1 | 4/2018 | Burns et al. |
| 2018/0129380 A1 | 5/2018 | Suh et al. |
| 2018/0136819 A1 | 5/2018 | Lee et al. |
| 2018/0144615 A1 | 5/2018 | Kinney et al. |
| 2018/0187954 A1 | 7/2018 | Yang et al. |
| 2018/0259832 A1 | 9/2018 | Chen et al. |
| 2018/0263104 A1 | 9/2018 | Hamada et al. |
| 2018/0267390 A1 | 9/2018 | Kim et al. |
| 2018/0311582 A1 | 11/2018 | Gerhard et al. |
| 2018/0330169 A1 | 11/2018 | van Hoof et al. |
| 2018/0340646 A1 | 11/2018 | Mehdi et al. |
| 2018/0343402 A1 | 11/2018 | Roth et al. |
| 2018/0343403 A1 | 11/2018 | Mehdi et al. |
| 2018/0343772 A1 | 11/2018 | Raghupathy et al. |
| 2018/0349708 A1 | 12/2018 | van Hoof et al. |
| 2019/0323651 A1 | 10/2019 | Mehdi et al. |
| 2019/0394905 A1 | 12/2019 | Jin et al. |
| 2020/0236266 A1 | 7/2020 | Krammer et al. |
| 2020/0332947 A1 | 10/2020 | Raghupathy et al. |
| 2021/0029308 A1 | 1/2021 | Roth et al. |

FOREIGN PATENT DOCUMENTS

| | | |
|---|---|---|
| KR | 20120068655 | 6/2012 |
| KR | 20150065169 | 6/2015 |
| KR | 20150092670 | 8/2015 |
| WO | 2006120596 | 11/2006 |
| WO | 2009138037 | 11/2009 |
| WO | 2013009828 | 1/2013 |
| WO | 2014137372 | 9/2014 |

OTHER PUBLICATIONS

Google LLC, International Preliminary Report on Patentability, PCT/US2018/020900, dated Nov. 26, 2019, 12 pgs.

(56) References Cited

OTHER PUBLICATIONS

"Advisory Action", U.S. Appl. No. 15/608,904, dated May 18, 2020, 3 pages.
"Advisory Action", U.S. Appl. No. 15/607,387, dated Nov. 1, 2019, 3 pages.
"Advisory Action", U.S. Appl. No. 15/608,904, dated Nov. 8, 2019, 3 pages.
"AppCrawlr, ipCam FC—IP camera surveillance (ios)", Retrieved at: apperawl.com/ios/ipcam-fc-ip-camera-surveillance—on Jul. 16, 2015, 2 pages.
"Arlo on the App Store on iTunes", Retrieved at: https://apps.apple.com/us/app/arlo/id925911312—on Jul. 15, 2015, 2 pages.
"Bluetooth-conrolled Pan/Tilt Servo Platform Using Android as Remote", Retrieved at: www.techbitar.com/bluetooth-controlled-pan-tilt-servo.html—on Nov. 19, 2020, 8 pages.
"D-Link Corporation, mydlink App", Retrieved at: www.mydlink.com/apps—on Jul. 15, 2015, 4 pages.
"D-Link Corporation, mydlink Lite", downloaded Jul. 15, 2015 from: itunes.apple.com/us/app/mydlink-lite/id372571229?mt=8, 2 pages.
"D-Link Corporation, mydlink+,", downloaded Jul. 15, 2015, From: itunes.apple.com/us/app/mydlink/id479832296?mt=8, 2 pages.
"Dropcam", Retrieved from: https://play.google.com/store/apps/details?id=com.dropcam.android, Aug. 20, 2015, 3 pages.
"Extended European Search Report", EP Application No. 18156966.6, dated Jun. 26, 2018, 11 pages.
"Features> Button Bars", Available from Internet: http://insiteout.brinkster.net/Website%20New/buttonbars.asp, May 8, 2011, 6 pages.
"Final Office Action", U.S. Appl. No. 15/607,387, dated Aug. 21, 2019, 12 pages.
"Final Office Action", U.S. Appl. No. 15/608,904, dated Jan. 22, 2020, 18 pages.
"Final Office Action", U.S. Appl. No. 15/608,904, dated Aug. 1, 2019, 21 pages.
"Final Office Action", U.S. Appl. No. 15/607,380, dated Dec. 20, 2019, 6 pages.
"First Action Interview Office Action", U.S. Appl. No. 15/607,380, dated Mar. 18, 2019, 13 pages.
"First Action Interview Office Action", U.S. Appl. No. 15/607,387, dated Mar. 7, 2019, 15 pages.
"First Action Interview Office Action", U.S. Appl. No. 15/607,368, dated Mar. 18, 2019, 19 pages.
"First Action Interview Office Action", U.S. Appl. No. 15/608,904, dated Dec. 10, 2018, 4 pages.
"First Action Interview Office Action", U.S. Appl. No. 15/594,518, dated Dec. 11, 2018, 4 pages.
"Foreign Office Action", KR Application No. 2019-7037435, dated Nov. 17, 2020, 12 pages.
"Foreign Office Action", EP Application No. 18156966.6, dated May 25, 2020, 5 pages.
"Foto de archivo", Retrieved at: https://es.123rf.com/photo_37507296_diseno-transparente-plantilla-de-interfaz-de-usuario-movil-disposicion-para-el-movil-pagina-web-il.html, Apr. 23, 2015, 3 pages.
"Google Image Search of Nest Icon", Retrieved from: https://www.google.com/search?q=nest+icon&rlz=1C1GCEBenUS799US799&biw=1920&bih=1109&source=Int&tbs=cdr%3A1%2Ccdnnin%3A%2Ccdnnax%3A7%2, 2 pages.
"International Preliminary Report on Patentability", Application No. PCT/US2018/020919, dated Nov. 12, 2019, 8 pages.
"International Search Report and Written Opinion", Application No. PCT/US2015/039425, dated Sep. 25, 2015, 12 pages.
"International Search Report and Written Opinion", Application No. PCT/US2018/020919, dated Jun. 11, 2018, 26 pages.
"Metal Fence on a dark background", Retrieved at: https://stockfresh.com/image/2626471/metal-fence-on-a-dark-background, Feb. 28, 2013, 1 page.
"Mini UI toolkit PSD Download", www.freepsds123.com/2014/06/21/mini-ui-toolkit-psd-download/, Jun. 21, 2014, 1 page.
"Netgear, Home Security Systems/ Security Cameras/ Ario", http://www.arlo.com/en-us/, Jul. 16, 2015, 6 pages.

"Non-Final Office Action", U.S. Appl. No. 15/606,888, dated Oct. 5, 2018, 11 pages.
"Non-Final Office Action", U.S. Appl. No. 15/607,380, dated Apr. 7, 2020, 12 pages.
"Non-Final Office Action", U.S. Appl. No. 15/607,380, dated Jul. 31, 2020, 17 pages.
"Non-Final Office Action", U.S. Appl. No. 15/607,368, dated Jan. 22, 2020, 18 pages.
"Non-Final Office Action", U.S. Appl. No. 15/608,904, dated Aug. 7, 2020, 21 pages.
"Non-Final Office Action", U.S. Appl. No. 15/594,518, dated Apr. 2, 2019, 25 pages.
"Non-Final Office Action", U.S. Appl. No. 15/608,904, dated Apr. 11, 2019, 26 pages.
"Non-Final Office Action", U.S. Appl. No. 16/903,049, dated Sep. 16, 2020, 9 pages.
"Notice of Allowance", U.S. Appl. No. 15/607,387, dated Feb. 10, 2020, 16 pages.
"Notice of Allowance", U.S. Appl. No. 15/607,368, dated Jun. 19, 2020, 5 pages.
"Notice of Allowance", U.S. Appl. No. 15/606,888, dated Mar. 6, 2019, 8 pages.
"Octopussy (1983)—Cancelled", https://www.mi6-hq.com/sections/games/octopussy_1983, Oct. 2, 2014, 2 pages.
"Pre-Interview First Office Action", U.S. Appl. No. 15/607,368, dated Jan. 11, 2019, 3 pages.
"Pre-Interview First Office Action", U.S. Appl. No. 15/607,380, dated Jan. 11, 2019, 3 pages.
"Pre-Interview First Office Action", U.S. Appl. No. 15/607,387, dated Oct. 12, 2018, 3 pages.
"Pre-Interview First Office Action", U.S. Appl. No. 15/594,518, dated Sep. 4, 2018, 5 pages.
"Pre-Interview First Office Action", U.S. Appl. No. 15/608,904, dated Sep. 7, 2018, 5 pages.
"Pulsating Animation", Retrieved at: https://dribbble.com/shots/3218158-Pulsating-animation, Jan. 15, 2017, 1 page.
"Simi, ipCamFC—IP camera surveillance", Retrieved at: itunes.apple.com/us/app/ipcam-fc-ip-camera-surveillance/id548480721?mt=8—on Jul. 15, 2015, 2 pages.
"Stock Vector—Web Site Interface Icons // Button Bar Series", https://www.alamy.com/web-site-interface-icons-button-bar-series-image64003090.html, Aug. 2010, 1 page.
"Two-Shot Injection Molding Solutions", https://geminigroup.net/plastics/two-shot-and-injection-molding-tpi/processes/two-shot-multi-shot/, May 14, 2020, 8 pages.
"Vector Video Player", Retrieved at: https://www.shutterstock.com/fr/image-vector/vector-audio-video-player-web-101573365, Aug. 21, 2014, 4 pages.
"Viewer for D-Link Cams IOS Version 3.1.2, 2013", Retrieved at: http://www.eyespyfx.com/dlink.php—on Jul. 15, 2015, 19 pages.
Ahmed, Nafees , "5 Best Video Editing Apps for Android Devices", Retrieved at: http://techbuzzes.com/2013/03/best-video-editing-apps-for-android/, Mar. 23, 2013, 10 pages.
Baer, Drake , "Apple Has Reportedly Reversed the Ban on This Mindfulness App From the App Store", Apr. 12, 2017, 2 pages.
"WiCam: Wireless iPhone Camera, Rochester Institute of Technology", Retrieved at: www.ce/rit/edu/research/projects/2010-spring/WICam/index.html—on Jul. 15, 2015, 1 page.
Fitzner, Michael , "Editing Effects Software to Make Your Video Sing", May 1, 2012, 7 pages.
Hoang, Le , "YouTube: How to Find Previously Watched Videos", Retrieved at: https://www.tech-recipes.com/rx/11104/youtube-how-to-find-all-the-previously-watched-videos/, Feb. 15, 2011, 2 pages.
Lipton, U A. et al., "Moving Target Classification and Tracking from Real-Time Video", Oct. 1998, 7 pages.
Mckenna, Stephen J. et al., "Tracking Groups of People", Oct. 2000, 15 pages.
Mooji, Andre , "Tap to Begin", Available at: https://dribbble.com/shots/3113672-Tap-to-Begin, 2016, 2 pages.
Nunal, Paul , "Best Android apps for videographers and video editors", May 3, 2012, 12 pages.
Raiz, Greg , "Wireframe toolkit for Keynote and Powerpoint", Jun. 29, 2011, 7 pages.

(56) References Cited

OTHER PUBLICATIONS

Russel, Holly, "Nest Aware, and why the Nest Cam subscription makes sense", https://www.androidcentral.com/nest-aware-and-why-nest-cam-subscription-makes-sense, Jul. 3, 2015, 5 pages.

Tenon, Biff, "Abstract background with animation of flicker and moving patterns from clear colorful circles. Animation of seamless loop", Retrieved at: https://www.shutterstock.com/fr/video/clip-24321839-abstract-background-animation-flicker-moving-patterns-clear—on Nov. 2020, 3 pages.

Viola, Paul et al., "Rapid Object Detection Using a Boosted Cascade of Simple Features", Feb. 2001, 11 pages.

Visavadia, Jay, "i0S7 Wireframe", https://dribbble.com/shots/1352315-i0S7-Wireframe, Dec. 19, 2013, 1 page.

Wilson, Phillip I. et al., "Facial Feature Detection Using Haar Classifiers", Apr. 2006, 7 pages.

Wollerton, Megan, "Netgear Arlo Smart Home Security review: Netgear's Arlo defies typical security camera limitations", www.cnet.com/products/netgear-arlo-smart-home-security-kit, Feb. 2, 2015, 5 pages.

Wollerton, Megan, "Turn your old iPod into a security camera for free, CNET,", https://www.cnet.com/how-to/turn-your-old-ipod-into-a-security-camera-for-free/, Dec. 17, 2014, 3 pages.

"Final Office Action", U.S. Appl. No. 15/608,904, dated Dec. 28, 2020, 24 pages.

"Notice of Allowance", U.S. Appl. No. 16/903,049, dated Feb. 9, 2021, 8 pages.

\* cited by examiner

VIDEO CAMERA ASSEMBLY HAVING AN IR REFLECTOR

RELATED APPLICATIONS

This application claims priority to U.S. Provisional Application No. 62/511,302, entitled "Video Camera Assembly," filed May 25, 2017, which is hereby incorporated by reference in its entirety.

This application is related to U.S. patent application Ser. No. 15/607,387, filed May 26, 2017, entitled "Thermal Management for a Compact Electronic Device," U.S. patent application Ser. No. 15/607,368, filed May 26, 2017, entitled "Camera Assembly Having a Single-Piece Cover Element," U.S. patent application Ser. No. 15/606,888, filed May 26, 2017, entitled "Stand Assembly for an Electronic Device Providing Multiple Degrees of Freedom and Built-in Cables," and U.S. Design application No. 29/605,503, filed May 26, 2017, entitled "Camera," each of which is hereby incorporated by reference in its entirety.

This application is also related to U.S. patent application Ser. No. 15/594,518, filed May 12, 2017, entitled "Methods and Systems for Presenting Image Data for Detected Regions of Interest;" U.S. patent application Ser. No. 15/334,172, filed Oct. 25, 2016, entitled "Method and System for Categorizing Motion Events;" and U.S. patent application Ser. No. 15/403,067, filed Jan. 10, 2017, entitled "Systems, Methods, and Devices for Managing Coexistence of Multiple Transceiver Devices Using Bypass Circuitry," each of which is hereby incorporated by reference in its entirety.

TECHNICAL FIELD

This relates generally to camera assemblies, including but not limited to, video camera assemblies having infrared reflectors.

BACKGROUND

Video surveillance cameras are used extensively. Usage of video cameras in residential and commercial environments has increased substantially, in part due to lower prices and simplicity of deployment.

As consumer demands change and the complexity of home automation and related systems increases, various new challenges, such as heat and illumination management, arise in designing such camera products. For example, ineffective IR illumination technologies not only unnecessarily consume large amounts of power and generate large amounts of heat, but are also have undesirable visual appearances. For another example, the use of multiple wireless communication technologies in products having complicated thermal management demands the intelligent design of antenna structures. For yet another example, installing cable wiring outside of a camera stand not only has undesirable visual appearances but also often results in limitations to the degrees of freedom of motion.

SUMMARY

Accordingly, there is a need for systems and/or devices with more efficient, accurate, and effective methods for illuminating, capturing, and analyzing scenes, among other things. Such systems, devices, and methods optionally complement or replace conventional systems, devices, and methods for illuminating, capturing, and analyzing scenes.

The present disclosure describes compact camera(s) implementations with high-powered on-camera processing, low-light (e.g., night-time) illumination, passive cooling, an ability to concurrently transmit multiple HD video streams, and an ability to wirelessly communicate with other devices over multiple protocols (e.g., Wi-Fi, Bluetooth, and IEEE 15.4). Such devices generate large amounts of heat (e.g., from the processors) and yet include heat-sensitive components, such as the image sensor. In such devices, it is important to channel the heat away from the high-sensitive components while maintaining the compact, passively-cooled aspects of the camera(s). In addition, the camera image sensors are inherently sensitive to light, and thus it is important to keep light from the camera's illuminators, color or IR, from entering the image sensor. Components for manipulating the light from the camera's illuminators, e.g., reflectors and diffusers, are important to prevent wash out or anomalies in the captured images. The implementations described herein include components, such as the IR reflector, configured to prevent heat and/or light from interfering with sensitive camera components.

It is desirable to have an IR reflector for the IR illuminators to direct the illumination to uniformly illuminate the portion of the scene in the camera's field of view as this reduces anomalies and improves the quality of images captured by the image sensor. It is also desirable to have the IR reflector adapted to minimize the amount of illumination sent outside of the camera's field of view. By reducing the amount of illumination sent outside of the camera's field of view, the amount and/or intensity of the IR illuminators required to provide adequate illumination is reduced. Although, for convenience, the illuminators and reflector are described herein as adapted for infrared light, in some implementations other types of non-visible illuminators and reflector(s) are used (e.g., ultraviolet illuminators and reflectors).

It is also desirable to have a single-piece cover glass (or other transparent substance) as it creates a more aesthetically pleasing look, reduces production costs by reducing the number of parts, reduces complexity by eliminating the need to tightly fit multiple sections, increases waterproofing of the device by eliminating seams between multiple sections, and increases a quality of the images captured by the image sensor.

It is also desirable that the camera provide visual and/or audio feedback to a user. The feedback may concern an operational status of the camera itself, the operational status of another electronic device associated with the camera, and/or the operational status of a set of electronic devices associated with the camera.

In environments in which security cameras are commonly deployed, such as in a work or home environment (indoors or outdoors), it is advantageous to configure the camera with physical features that can provide real time camera status information and/or audio/visual content that indicates or complements camera processing activity, to occupants of the environment without disturbing operation of the camera or the occupants. In some implementations, such physical features include a light ring that is provided at a periphery of the camera and is configured to be visible to occupants of the environment from a wide range of positions in the environment. For example, in some camera implementations, the light ring is configured to be visible in a range of positions that includes at least areas of the environment that fall within the camera's field of view. In some camera implementations, the light ring has a plurality of individual lighting elements, each having associated lighting characteristics that are individually controllable to reflect local camera status and/or a camera processing state/operation. In some configurations, the controllable lighting characteristics include one or more of on/off state, hue, saturation and/or brightness/intensity. In some configurations, the lighting elements are controlled individually to display an overall pattern (e.g., an entire ring or one or more portions of a ring) that can be static or dynamic (e.g., one or more rotating portions of a ring) consisting of a single displayed color or two or more different displayed colors. Each of the patterns can conform to a visual language and correspond to a camera status and/or a camera processing operation. For example, a color or a pattern of two or more different colors (static or dynamic) can indicate that the camera is on or off, has an active or inactive connection to a server (e.g., a server that performs image processing or that distributes video and notifications to remote users), is actively processing local information from the environment, or has received a notification or status information from another smart device in the home environment or a server. In camera implementations that include a speaker, the physical feature (e.g., a light ring) can be controlled by the camera to display patterns that correspond to audible beats/rhythm of music being played from the speaker in a range of colors selected to match the tempo/feeling of the music. Providing such information via light patterns is advantageous as this is readily perceived by all/most users in the environment (even if they do not have access to camera smart phone app.) without intruding on activity of occupants in the environment, as audible alerts could do.

It is also desirable that the camera have a stand that both encloses the various interconnect wires and has a wide degree of rotational freedom. Enclosing the interconnect wires reduces wear on the wires, reduces the odds of the wires being damaged, increases the aesthetics for the camera, and increases the rotational freedom of the camera. Increasing the rotational freedom of the camera increases user satisfaction with the camera as it increases the potential locations where the camera can be placed to have a desired field of view. It is also desirable for the camera stand to provide stable support for the camera, which, due to its substantial on-board processing power and communications capabilities, can be relatively heavy in comparison to its size, while also being compact and portable, so as to allow for a high degree of flexibility in placement of the camera, and to provide for free-standing, stable use of the camera, or for attachment of the camera to a wide range of mounting surfaces in a wide range of orientations.

It is also desirable that the camera operate continuously, or near continuously, and thus heat generation and dissipation is very important. Accordingly, there is a need for a substantially compact electronic device to incorporate some heat dissipation mechanisms that dissipate heat generated within the electronic device away from a heat-sensitive assembly of the electronic device. Specifically, in accordance with some implementations, the heat dissipation mechanisms passively conduct heat generated by a heat-sensitive electronic assembly and/or another heat generating electronic assembly away from the heat-sensitive electronic assembly efficiently without using a fan. Given a compact form factor of the electronic device, the heat dissipation mechanisms are also configured to mechanically support the heat-sensitive electronic assembly, the heat generating electronic assembly or both without interfering with intended functions of the electronic device.

For example, the electronic device may include an Internet camera that contains a plurality of electronic assemblies in a compact housing and has various capabilities for capturing, processing and streaming video images in real time. The electronic assemblies of the Internet camera include an image sensor assembly that is configured to capture and/or process the video image. The image sensor assembly is sensitive to heat generated by itself or by another system-on-chip (SoC) assembly. To deter a detrimental impact from the heat, two separate sets of thermally conductive parts could be used to conduct heat generated by the heat generating electronic assembly (e.g., the image sensor assembly of the camera) and/or the heat-sensitive electronic assembly (e.g., the SoC assembly of the camera) away from the heat-sensitive electronic assembly, respectively. The two separate sets of thermally conductive parts are closely disposed within the compact housing while being thermally isolated from each other.

In one aspect, some implementations include a video camera assembly having: (1) one or more processors configured to operate the video camera assembly in a day mode and in a night mode; (2) an image sensor having a field of view of a scene and configured to capture video of a first portion of the scene while in the day mode of operation and in the night mode of operation, the first portion corresponding to the field of view of the image sensor; (3) one or more infrared (IR) illuminators configured to provide illumination during the night mode of operation while the image sensor captures video; and (4) an IR reflector component configured to: (i) substantially restrict the illumination onto the first portion of the scene, and (ii) illuminate the first portion in a substantially uniform manner across the field of view of the image sensor.

In another aspect, some implementations include a camera assembly having: (1) an image sensor having a field of view corresponding to a scene; (2) one or more infrared (IR) illuminators configured to selectively illuminate the scene; and (3) a single-piece cover element positioned in front of the image sensor and the one or more IR illuminators such that light from the one or more IR illuminators is directed through the cover element and light from the scene passes through the cover element prior to entering the image sensor, the cover element including: (a) a first portion corresponding to the image sensor, the first portion substantially transparent to visible light and IR light; (b) a second portion corresponding to the one or more IR illuminators, the second portion coated to be substantially transparent to IR light; and (c) a third portion between the first portion and the second portion, the third portion coated to be substantially opaque to IR and visible light.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
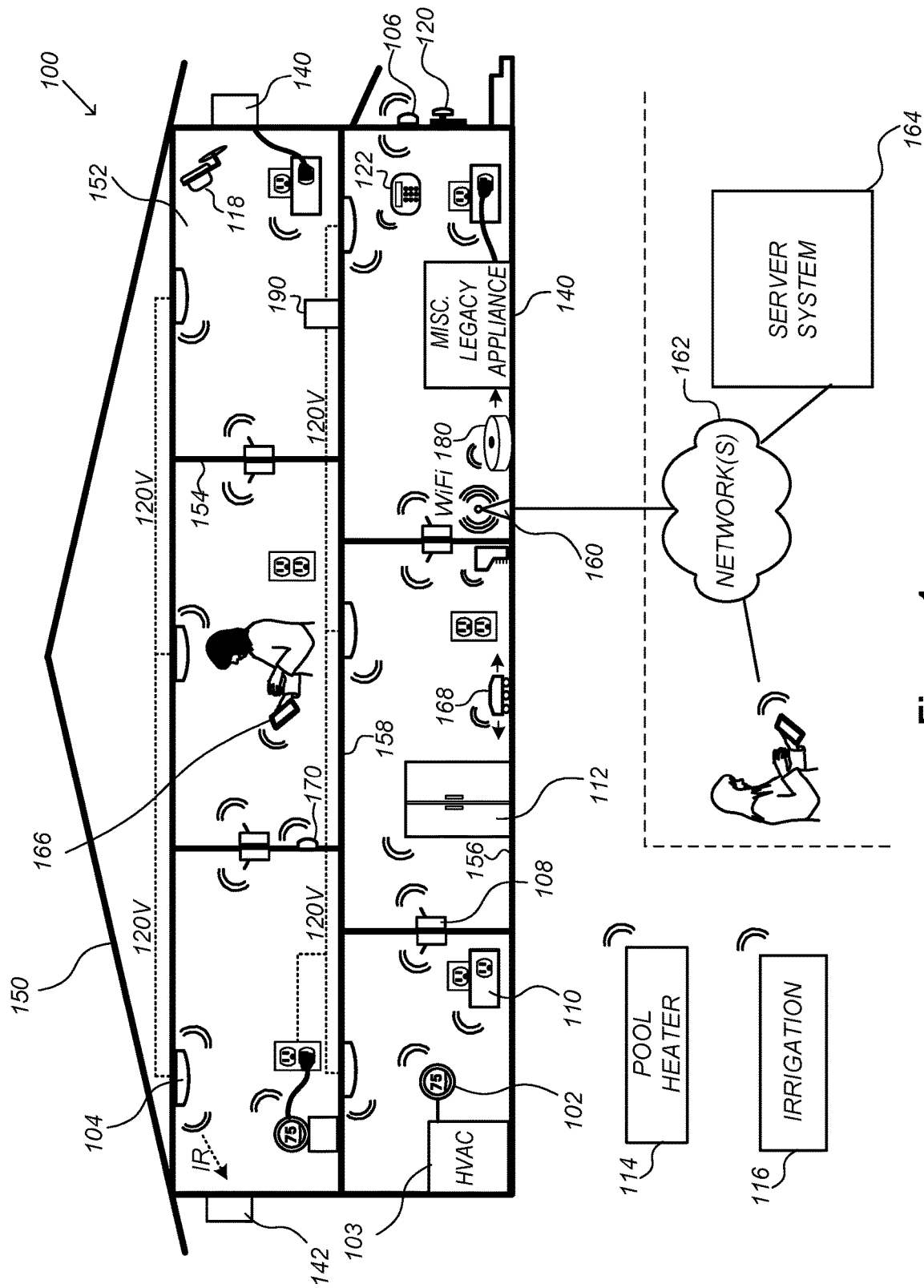
FIG. 1 is an example smart home environment in accordance with some implementations.

FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2A) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding black-body radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come). In some implementations, the smart doorbell 106 includes some or all of the components and features of the camera 118. In some implementations, the smart doorbell 106 includes a camera 118.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, local storage device 190 is communicatively coupled to one or more smart devices via a smart home network (e.g., smart home network 202, FIG. 2A). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of camera 118 exceeds the available bandwidth of the external network (e.g., network(s) 162). In some implementations, local storage device 190 temporarily stores video data from one or more cameras (e.g., camera 118) prior to transferring the video data to a server system (e.g., server system 164).

Figure 2A:
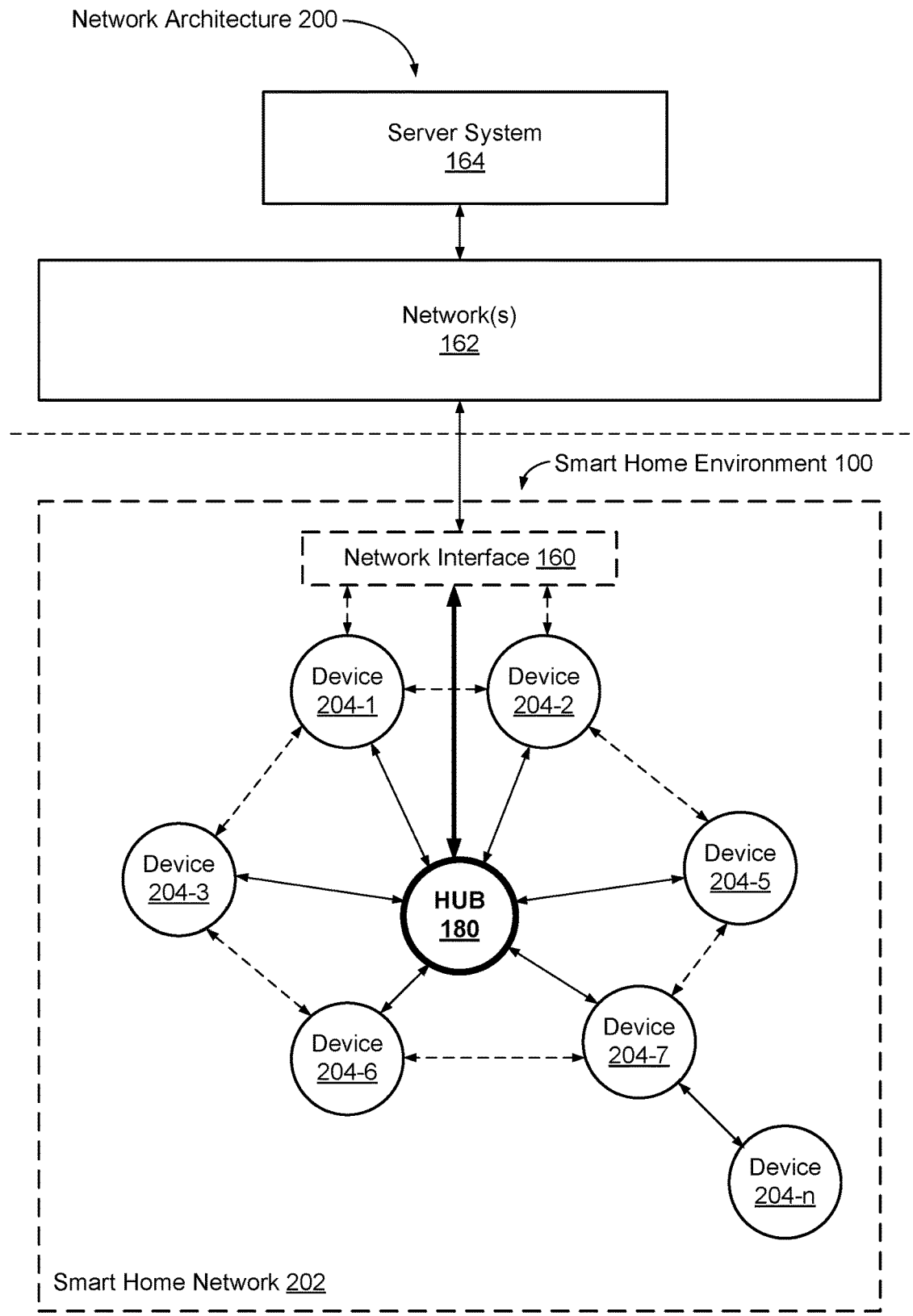
FIG. 2A is a block diagram illustrating an representative network architecture that includes a smart home network in accordance with some implementations.

FIG. 2A is a block diagram illustrating a representative network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
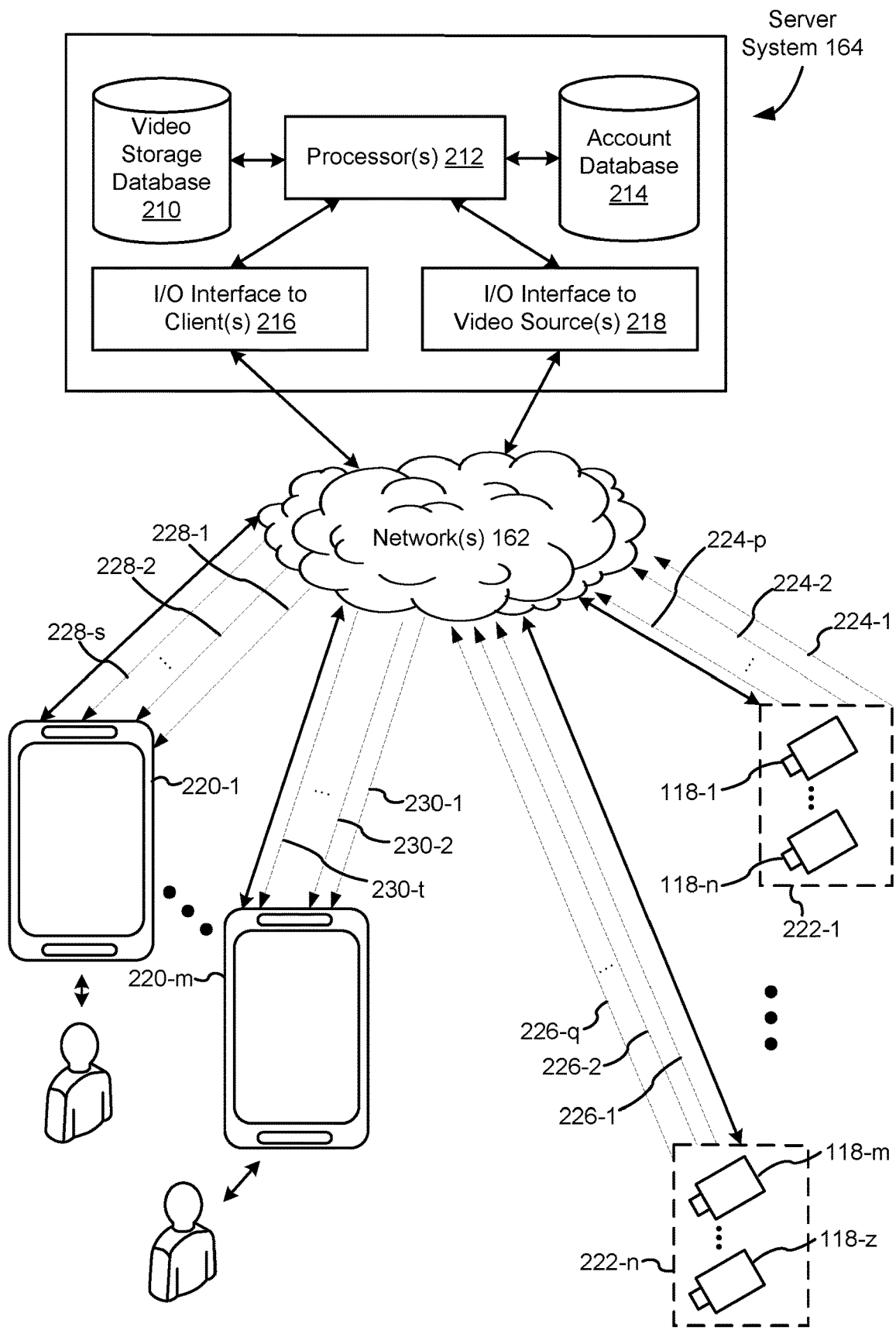
FIG. 2B is a representative operating environment in which a server system interacts with client devices and smart devices in accordance with some implementations.

FIG. 2B illustrates a representative operating environment in which a server system 164 provides data processing for monitoring and facilitating review of events (e.g., motion, audio, security, etc.) in video streams captured by video cameras 118. As shown in FIG. 2B, the server system 164 receives video data from video sources 222 (including cameras 118) located at various physical locations (e.g., inside homes, restaurants, stores, streets, parking lots, and/or the smart home environments 100 of FIG. 1). Each video source 222 may be bound to one or more reviewer accounts, and the server system 164 provides video monitoring data for the video source 222 to client devices 220 associated with the reviewer accounts. For example, the portable electronic device 166 is an example of the client device 220. In some implementations, the server system 164 is a video processing server that provides video processing services to video sources and client devices 220.

In some implementations, each of the video sources 222 includes one or more video cameras 118 that capture video and send the captured video to the server system 164 substantially in real-time. In some implementations, each of the video sources 222 includes a controller device (not shown) that serves as an intermediary between the one or more cameras 118 and the server system 164. The controller device receives the video data from the one or more cameras 118, optionally performs some preliminary processing on the video data, and sends the video data to the server system 164 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 164.

In accordance with some implementations, each of the client devices 220 includes a client-side module. The client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. The server-side module also provides server-side functionality for video processing and camera control for any number of the video sources 222, including any number of control devices and the cameras 118.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more cameras 118 and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 222 cooperatively.

In some implementations, a video source 222 (e.g., a camera 118) transmits one or more streams of video data to the server system 164. In some implementations, the one or more streams may include multiple streams, of respective resolutions and/or frame rates, of the raw video captured by the camera 118. In some implementations, the multiple streams may include a "primary" stream with a certain resolution and frame rate, corresponding to the raw video captured by the camera 118, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams are sent from the video source 222 directly to a client device 220 (e.g., without being routed to, or processed by, the server system 164). In some implementations, one or more of the streams is stored at the camera 118 (e.g., in memory 406, FIG. 4) and/or a local storage device (e.g., a dedicated recording device), such as a digital video recorder (DVR). For example, in accordance with some implementations, the camera 118 stores the most recent 24 hours of video footage recorded by the camera. In some implementations, portions of the one or more streams are stored at the camera 118 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream, as described in greater detail in U.S. patent application Ser. No. 15/594,518.

Figure 3A:
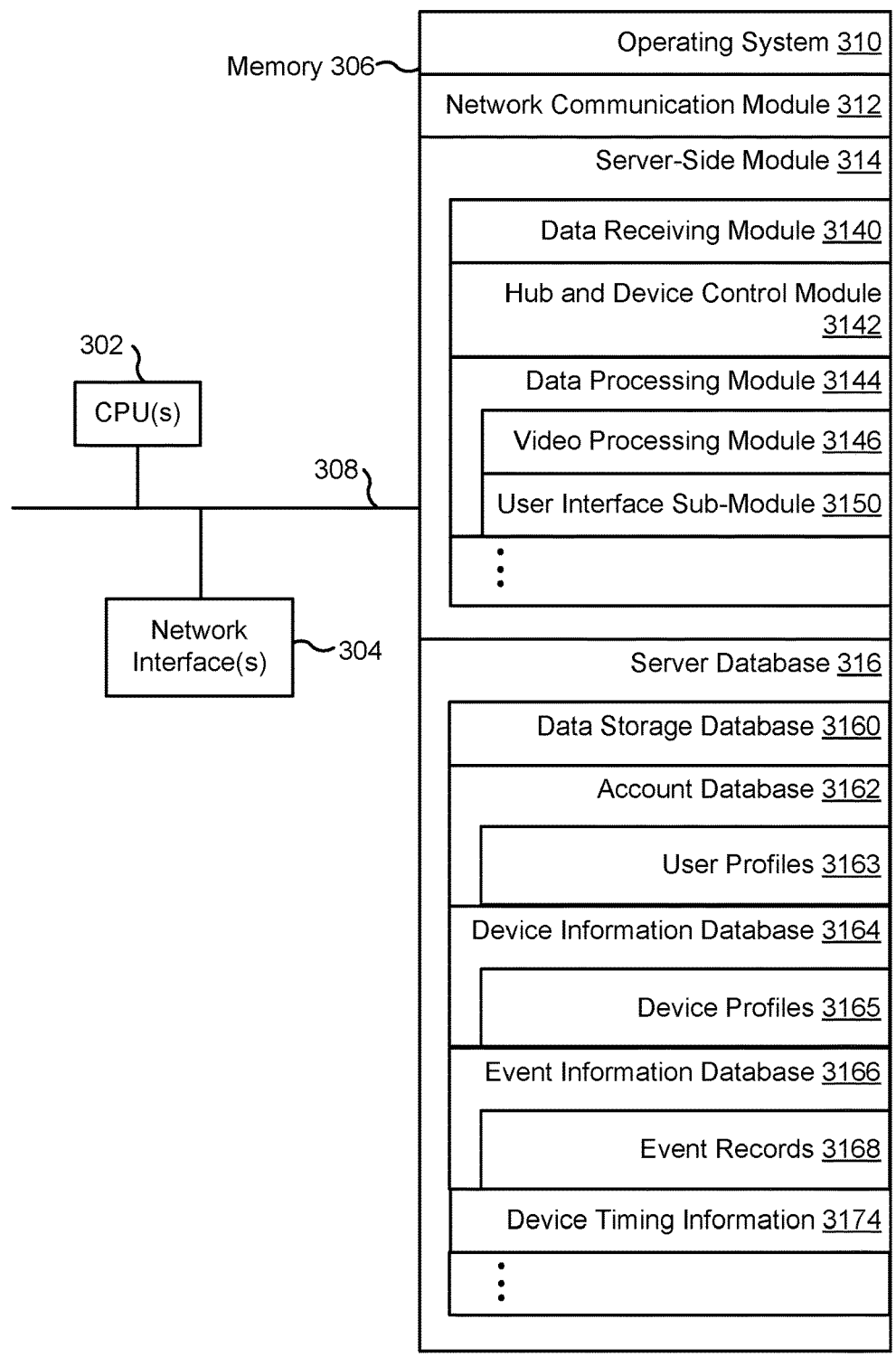
FIG. 3A is a block diagram illustrating a representative server system, in accordance with some implementations.

FIG. 3A is a block diagram illustrating the server system 164 in accordance with some implementations. The server system 164 typically includes one or more processing units (CPUs) 302, one or more network interfaces 304 (e.g., including an I/O interface to one or more client devices and an I/O interface to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. The memory 306, or alternatively the non-volatile memory within memory 306, includes a non-transitory computer readable storage medium. In some implementations, the memory 306, or the non-transitory computer readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 164 to other systems and devices (e.g., client devices, electronic devices, and systems connected to one or more networks 162) via one or more network interfaces 304 (wired or wireless);
- a server-side module 314, which provides server-side functionalities for device control, data processing, and data review, including, but not limited to:
  - a data receiving module 3140 for receiving data from electronic devices (e.g., video data from a camera 118, FIG. 1) via the hub device 180, and preparing the received data for further processing and storage in the data storage database 3160;
  - a hub and device control module 3142 for generating and sending server-initiated control commands to modify operation modes of electronic devices (e.g., devices of a smart home environment 100), and/or receiving (e.g., from client devices 220) and forwarding user-initiated control commands to modify operation modes of the electronic devices;
  - a data processing module 3144 for processing the data provided by the electronic devices, and/or preparing and sending processed data to a device for review (e.g., client devices 220 for review by a user), including, but not limited to:
    - an event processor sub-module 3146 for processing event candidates and/or events within a received video stream (e.g., a video stream from cameras 118);
    - an event categorizer sub-module 3148 for categorizing event candidates and/or events within the received video stream; and
    - a user interface sub-module 3150 for communicating with a user (e.g., sending alerts, timeline events, etc. and receiving user edits and zone definitions and the like)
- a server database 316, including but not limited to:
  - a data storage database 3160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;
  - an account database 3162 for storing account information for user accounts, including user account information such as user profiles 3163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
  - a device information database 3164 for storing device information related to one or more devices such as device profiles 3165, e.g., device identifiers and hub device specific secrets, independently of whether the corresponding hub devices have been associated with any user account; and an event information database 3166 for storing event information such as event records 3168, e.g., event log information, event categories, and the like.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 3B:
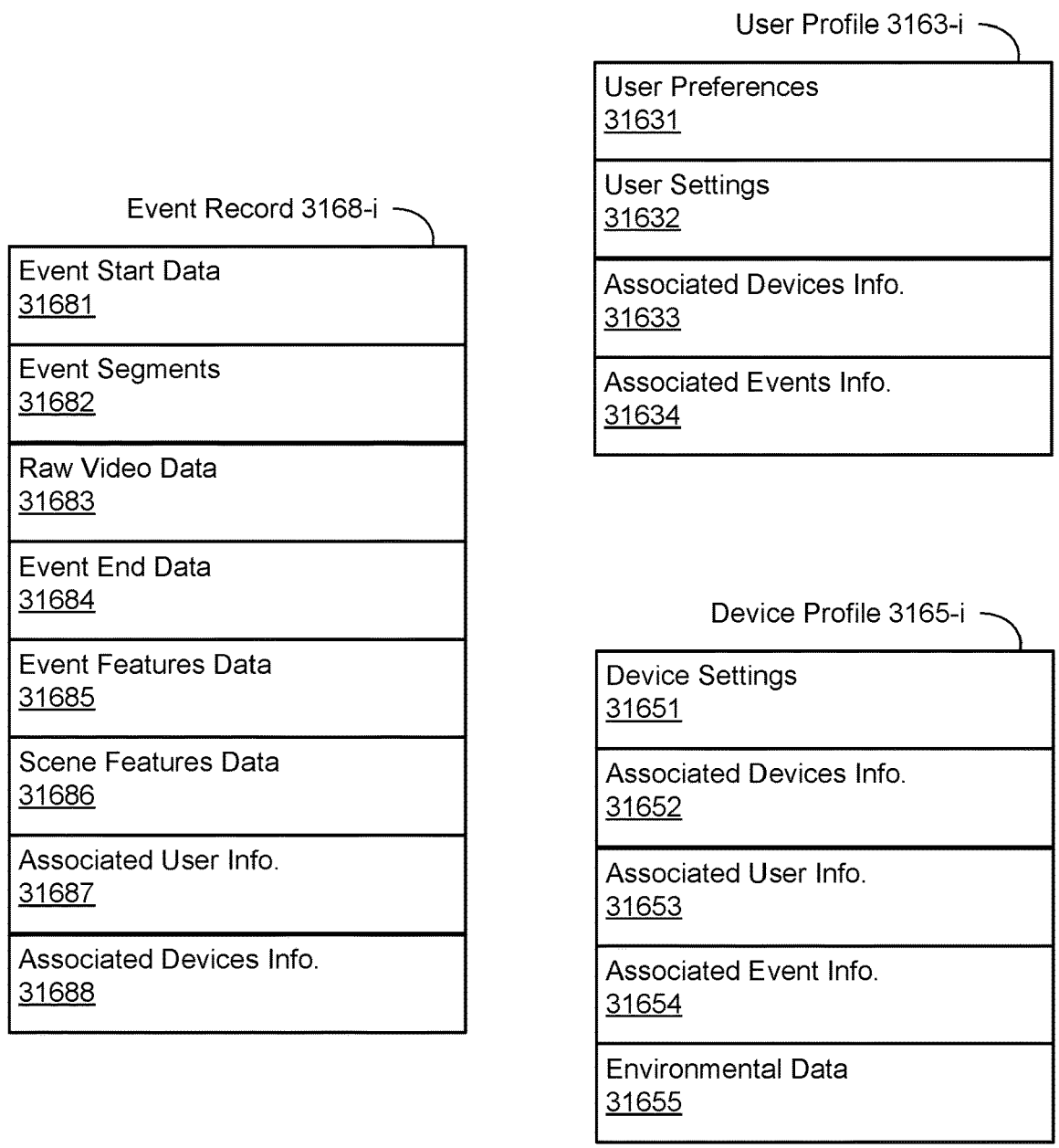
FIG. 3B illustrates various data structures used by some implementations.

FIG. 3B illustrates various data structures used by some implementations, including an event record 3168-i, a user profile 3163-i, and a device profile 3165-i. The event record 3168-i corresponds to an event i and data for the event i. In some instances, the data for motion event i includes event start data 31681 indicating when and/or how the event started, event segments data 31682, raw video data 31683, event end data 31684 indicating when and/or how the event ended, event features data 31685, scene features data 31686, associated user information 31687, and associated devices information 31688. In some instances, the event record 3168-i includes only a subset of the above data. In some instances, the event record 3168-i includes additional event data not shown such as data regarding event/motion masks.

The event start data 31681 includes date and time information such as a timestamp and optionally includes additional information such as information regarding the amount of motion present, a motion start location, amount of audio present, characteristics of the audio, and the like. Similarly, the event end data 31684 includes date and time information such as a timestamp and optionally includes additional information such as information regarding the amount of motion present, a motion start location, amount of audio present, characteristics of the audio, and the like.

The event segments 31682 includes information regarding segmentation of motion event i. In some instances, event segments are stored separately from the raw video data 31683. In some instances, the event segments are stored at a lower display resolution than the raw video data. For example, the event segments are optionally stored at 480p or 780p and the raw video data is stored at 1080i or 1080p. Storing the event segments at a lower display resolution enables the system to devote less time and resources to retrieving and processing the event segments. In some instances, the event segments are not stored separately and the segmentation information includes references to the raw video data 31683 as well as date and time information for reproducing the event segments. In some implementations, the event segments include one or more audio segments (e.g., corresponding to video segments).

The event features data 31685 includes information regarding event features such as event categorizations/classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like. The scene features data 31686 includes information regarding the scene in which the event took place such as depth map information, information regarding the location of windows, televisions, fans, the ceiling/floor, etc., information regarding whether the scene is indoors or outdoors, information regarding zones of interest, and the like. In some implementations, the event features data includes audio data, such as volume, pitch, characterizations, and the like.

The associated user information 31687 includes information regarding users associated with the event such as users identified in the event, users receiving notification of the event, and the like. In some instances, the associated user information 31687 includes a link, pointer, or reference to a user profile 3163 for to the user. The associated devices information 31688 includes information regarding the device or devices involved in the event (e.g., a camera 118 that recorded the event). In some instances, the associated devices information 31688 includes a link, pointer, or reference to a device profile 3165 for the device.

The user profile 3163-i corresponds to a user i associated with the smart home network (e.g., smart home network 202) such as a user of a hub device 204, a user identified by a hub device 204, a user who receives notifications from a hub device 204 or from the server system 164, and the like. In some instances, the user profile 3163-i includes user preferences 31631, user settings 31632, associated devices information 31633, and associated events information 31634. In some instances, the user profile 3163-i includes only a subset of the above data. In some instances, the user profile 3163-i includes additional user information not shown such as information regarding other users associated with the user i.

The user preferences 31631 include explicit user preferences input by the user as well as implicit and/or inferred user preferences determined by the system (e.g., server system 164 and/or client device 220). In some instances, the inferred user preferences are based on historical user activity and/or historical activity of other users. The user settings 31632 include information regarding settings set by the user i such as notification settings, device settings, and the like. In some instances, the user settings 31632 include device settings for devices associated with the user i.

The associated devices information 31633 includes information regarding devices associated with the user i such as devices within the user's smart home environment 100 and/or client devices 220. In some instances, associated devices information 31633 includes a link, pointer, or reference to a corresponding device profile 3165. Associated events information 31634 includes information regarding events associated with user i such as events in which user i was identified, events for which user i was notified, events corresponding to user i's smart home environment 100, and the like. In some instances, the associated events information 31634 includes a link, pointer, or reference to a corresponding event record 3168.

The device profile 3165-i corresponds to a device i associated with a smart home network (e.g., smart home network 202) such a hub device 204, a camera 118, a client device 220, and the like. In some instances, the device profile 3165-i includes device settings 31651, associated devices information 31652, associated user information 31653, associated event information 31654, and environmental data 31655. In some instances, the device profile 3165-i includes only a subset of the above data. In some instances, the device profile 3165-i includes additional device information not shown such as information regarding whether the device is currently active.

The device settings 31651 include information regarding the current settings of device i such as positioning information, mode of operation information, and the like. In some instances, the device settings 31651 are user-specific and are set by respective users of the device i. The associated devices information 31652 includes information regarding other devices associated with device i such as other devices linked to device i and/or other devices in the same smart home network as device i. In some instances, the associated devices information 31652 includes a link, pointer, or reference to a respective device profile 3165 corresponding to the associated device.

The associated user information 31653 includes information regarding users associated with the device such as users receiving notifications from the device, users registered with the device, users associated with the smart home network of the device, and the like. In some instances, the associated user information 31653 includes a link, pointer, or reference to a user profile 3163 corresponding to the associated user.

The associated event information 31654 includes information regarding events associated with the device i such as historical events involving the device i. In some instances, the associated event information 31654 includes a link, pointer, or reference to an event record 3168 corresponding to the associated event.

The environmental data 31655 includes information regarding the environment of device i such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

Figure 4:
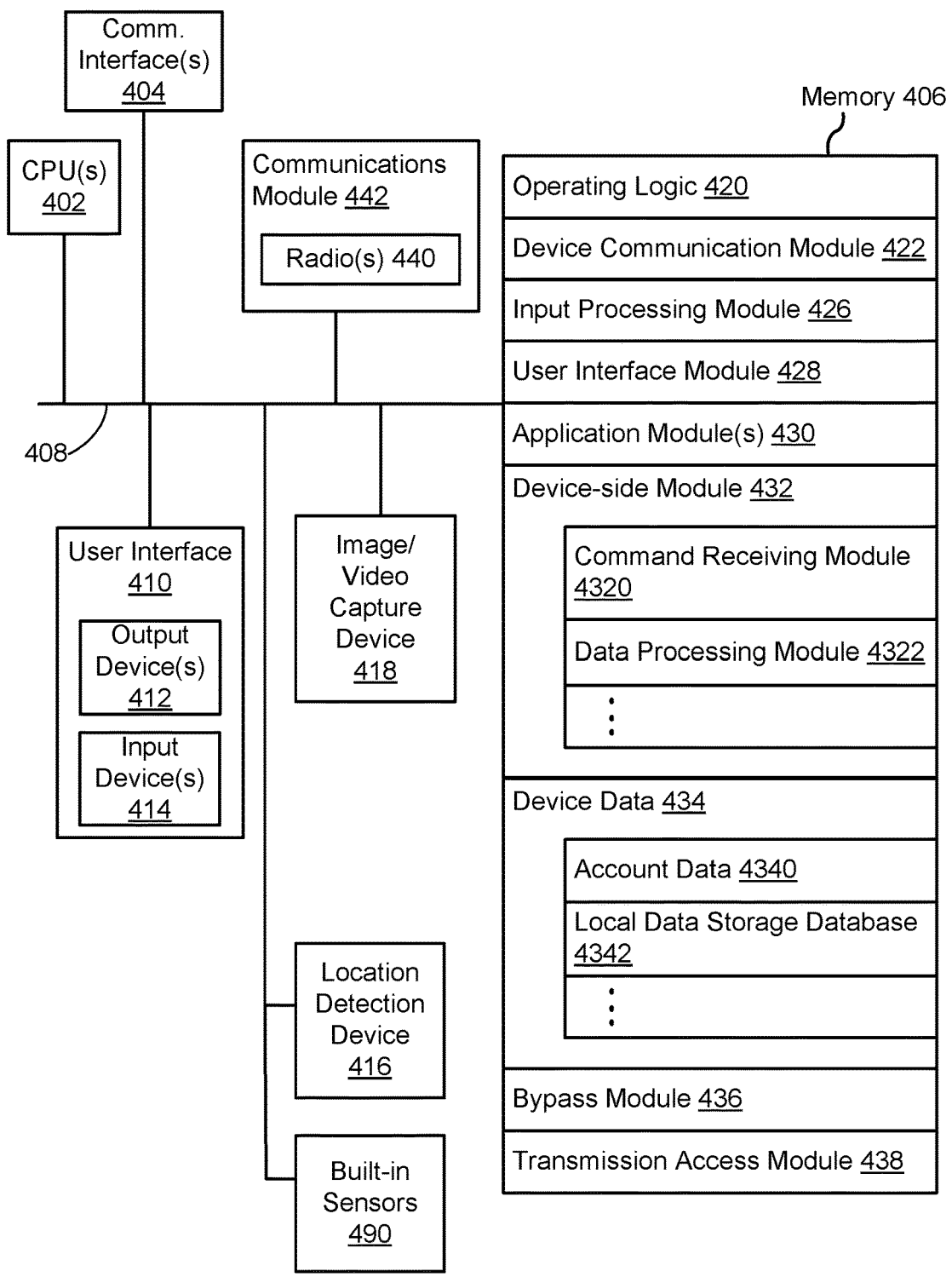
FIG. 4 is a block diagram illustrating a representative smart device, in accordance with some implementations.

FIG. 4 is a block diagram illustrating a representative smart device 204 in accordance with some implementations. In some implementations, the smart device 204 (e.g., any devices of a smart home environment 100, FIG. 1) includes one or more processing units (e.g., CPUs, ASICs, FPGAs, microprocessors, and the like) 402, one or more communication interfaces 404, memory 406, communications module 442 with radios 440, and one or more communication buses 408 for interconnecting these components (sometimes called a chipset). In some implementations, the user interface 410 includes one or more output devices 412 that enable presentation of media content, including one or more speakers and/or one or more visual displays. In some implementations, the user interface 410 also includes one or more input devices 414, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 418 (e.g., cameras, video cameras, scanners, photo sensor units).

The built-in sensors 490 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 440 enable one or more radio communication networks in the smart home environments, and allow a smart device 204 to communicate with other devices. In some implementations, the radios 440 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/ or any of a variety of custom or standard wired protocols (e.g., Ethernet, HomePlug, etc.), or any other suitable communication protocol, including communication protocols not yet developed as of the filing date of this document.

The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, or alternatively the non-volatile memory within the memory 406, includes a non-transitory computer readable storage medium. In some implementations, the memory 406, or the non-transitory computer readable storage medium of the memory 406, stores the following programs, modules, and data structures, or a subset or superset thereof:

- operating logic 420 including procedures for handling various basic system services and for performing hardware dependent tasks;
- a device communication module 422 for connecting to and communicating with other network devices (e.g., network interface 160, such as a router that provides Internet connectivity, networked storage devices, network routing devices, server system 164, etc.) connected to one or more networks 162 via one or more communication interfaces 404 (wired or wireless);
- an input processing module 426 for detecting one or more user inputs or interactions from the one or more input devices 414 and interpreting the detected inputs or interactions;
- a user interface module 428 for providing and displaying a user interface in which settings, captured data, and/or other data for one or more devices (e.g., the smart device 204, and/or other devices in smart home environment 100) can be configured and/or viewed;
- one or more applications 430 for execution by the smart device (e.g., games, social network applications, smart home applications, and/or other web or non-web based applications) for controlling devices (e.g., executing commands, sending commands, and/or configuring settings of the smart device 204 and/or other client/ electronic devices), and for reviewing data captured by devices (e.g., device status and settings, captured data, or other information regarding the smart device 204 and/or other client/electronic devices);
- a device-side module 432, which provides device-side functionalities for device control, data processing and data review, including but not limited to:
    - a command receiving module 4320 for receiving, forwarding, and/or executing instructions and control commands (e.g., from a client device 220, from a server system 164, from user inputs detected on the user interface 410, etc.) for operating the smart device 204;
    - a data processing module 4322 for processing data captured or received by one or more inputs (e.g., input devices 414, image/video capture devices 418, location detection device 416), sensors (e.g., built-in sensors 490), interfaces (e.g., communication interfaces 404, radios 440), and/or other components of the smart device 204, and for preparing and sending processed data to a device for review (e.g., client devices 220 for review by a user); and device data 434 storing data associated with devices (e.g., the smart device 204), including, but is not limited to:
  account data 4340 storing information related to user accounts loaded on the smart device 204, wherein such information includes cached login credentials, smart device identifiers (e.g., MAC addresses and UUIDs), user interface settings, display preferences, authentication tokens and tags, password keys, etc.;
  local data storage database 4342 for selectively storing raw or processed data associated with the smart device 204 (e.g., video surveillance footage captured by a camera 118);

a bypass module 436 for detecting whether radio(s) 440 are transmitting signals via respective antennas coupled to the radio(s) 440 and to accordingly couple radio(s) 440 to their respective antennas either via a bypass line or an amplifier (e.g., a low noise amplifier); and a transmission access module 438 for granting or denying transmission access to one or more radio(s) 440 (e.g., based on detected control signals and transmission requests).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 406, optionally, stores a subset of the modules and data structures identified above. Furthermore, the memory 406, optionally, stores additional modules and data structures not described above.

Figure 5:
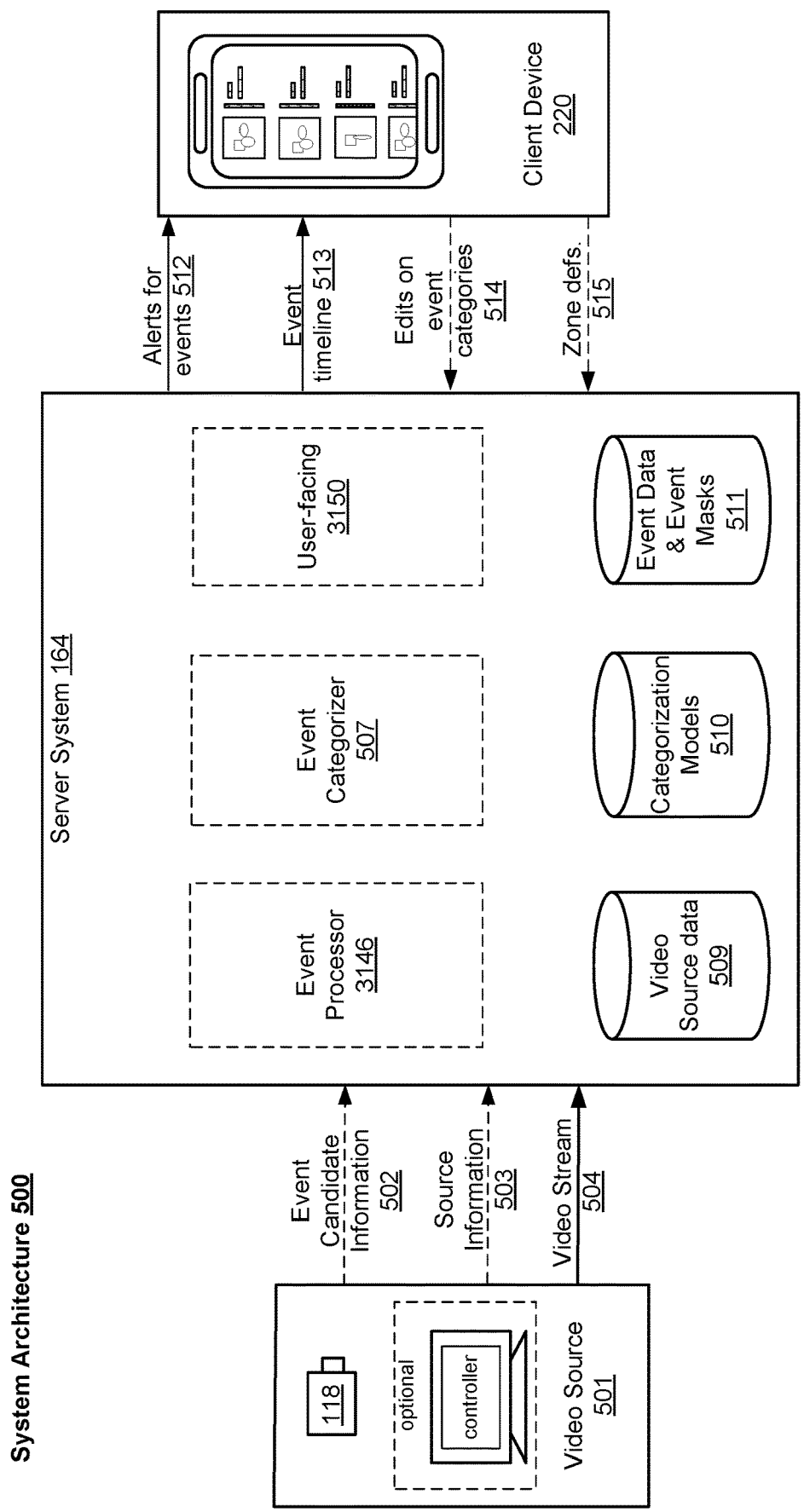
FIG. 5 illustrates a representative system architecture for video analysis and categorization, in accordance with some implementations.

FIG. 5 illustrates a representative system architecture 500. In some implementations, the server system 164 includes functional modules for an event processor 3146, an event categorizer 3148, and a user-facing frontend 3150. The event processor 3146 obtains the event candidates (e.g., by processing the video stream or by receiving the event start information from the video source 222). In some implementations, the event candidates comprise motion event candidates. In some implementations, the event candidates include audio and/or visual aspects. The event categorizer 3148 categorizes the event candidates into different event categories. The user-facing frontend 3150 generates event alerts and facilitates review of the events by a reviewer through a review interface on a client device 220. The client facing frontend also receives user edits on the event categories, user preferences for alerts and event filters, and zone definitions for zones of interest. The event categorizer optionally revises event categorization models and results based on the user edits received by the user-facing frontend. The server system 164 also includes a video and source data database 506, event categorization models database 510, and event data and event masks database 511. In some implementations, each of these databases is part of the server database 316 (e.g., part of data storage database 3160).

The server system 164 receives one or more video stream(s) 504 from the video source 222 and optionally receives event candidate information 502 such as event start information (e.g., motion start information) and source information 503 such as device settings for a camera 118 (e.g., a device profile 3165 for camera 118). In some implementations, the event processor sub-module 3146 communicates with the video source 222. The server system sends alerts for events 512 and event timeline information 513 to the client device 220. The server system 164 optionally receives user information from the client device 220 such as edits on event categories 514 and zone definitions 515.

The data processing pipeline 516 processes video information (e.g., a live video feed) received from a video source 222 (e.g., including a camera 118 and an optional controller device) and/or audio information received from one or more smart devices in real-time to identify and categorize events occurring in the smart home environment, and sends real-time event alerts and a refreshed event timeline to a client device 220 associated with a reviewer account for the smart home environment. The data processing pipeline 516 also processes stored information (such as stored video feeds from a video source 222) to reevaluate and/or re-categorize events as necessary, such as when new information is obtained regarding the event and/or when new information is obtained regarding event categories (e.g., a new activity zone is obtained from the user).

After video and/or audio data is captured at a smart device (517), the data is processed to determine if any potential event candidates are present. In some implementations, the data is initially processed at the smart device (e.g., video source 222 or camera 118). Thus, in some implementations, the smart device sends event candidate information, such as event start information, to the server system 164. In some implementations, the data is processed at the server system 164 for event start detection. In some implementations, the video and/or audio data is stored on server system 164 (e.g., in video and source data database 509). In some implementations, the video stream is stored on a server distinct from server system 164. In some implementations, after a motion start is detected, the relevant portion of the video stream is retrieved from storage (e.g., from video and source data database 509).

In some implementations, the event identification process includes segmenting the video stream into multiple segments then categorizing the event candidate within each segment. In some implementations, categorizing the event candidate includes an aggregation of background factors, entity detection and identification, motion vector generation for each motion entity, entity features, and scene features to generate motion features for the event candidate. In some implementations, the event identification process further includes categorizing each segment, generating or updating an event log based on categorization of a segment, generating an alert for the event based on categorization of a segment, categorizing the complete event, updating the event log based on the complete event, and generating an alert for the event based on the complete event. In some implementations, a categorization is based on a determination that the event occurred within a particular zone of interest. In some implementations, a categorization is based on a determination that the event candidate involves one or more zones of interest. In some implementations, a categorization is based on audio data and/or audio event characterization.

The event analysis and categorization process may be performed by the smart device (e.g., the video source 222) and the server system 164 cooperatively, and the division of the tasks may vary in different implementations, for different equipment capability configurations, and/or for different network and server load situations. After the server system 164 categorizes the event candidate, the result of the event detection and categorization may be sent to a reviewer associated with the smart home environment.

In some implementations, the server system 164 stores raw or compressed video data (e.g., in a video and source data database 509), event categorization models (e.g., in an event categorization model database 510), and event masks and other event metadata (e.g., in an event data and event mask database 511) for each of the video sources 222. In some implementations, the video data is stored at one or more display resolutions such as 480p, 780p, 1080i, 1080p, and the like.

In some implementations, the video source 222 (e.g., the camera 118) transmits a live video feed to the remote server system 164 via one or more networks (e.g., the network(s) 162). In some implementations, the transmission of the video data is continuous as the video data is captured by the camera 118. In some implementations, the transmission of video data is irrespective of the content of the video data, and the video data is uploaded from the video source 222 to the server system 164 for storage irrespective of whether any motion event has been captured in the video data. In some implementations, the video data may be stored at a local storage device of the video source 222 by default, and only video portions corresponding to motion event candidates detected in the video stream are uploaded to the server system 164 (e.g., in real-time).

In some implementations, the video source 222 dynamically determines at what display resolution the video stream is to be uploaded to the server system 164. In some implementations, the video source 222 dynamically determines which parts of the video stream are to be uploaded to the server system 164. For example, in some implementations, depending on the current server load and network conditions, the video source 222 optionally prioritizes the uploading of video portions corresponding to newly detected motion event candidates ahead of other portions of the video stream that do not contain any motion event candidates; or the video source 222 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 222 implements two parallel upload connections, one for uploading the continuous video stream captured by the camera 118, and the other for uploading video portions corresponding to detected motion event candidates. At any given time, the video source 222 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 5A, the video source 222 includes a camera 118, and an optional controller device. In some implementations, the camera 118 includes sufficient on-board processing power to perform all necessary local video processing tasks (e.g., cuepoint detection for motion event candidates, video uploading prioritization, network connection management, etc.), and the camera 118 communicates with the server system 164 directly, without any controller device acting as an intermediary. In some implementations, the camera 118 captures the video data and sends the video data to the controller device for the necessary local video processing tasks. The controller device optionally performs the local processing tasks for multiple cameras. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 164. In some implementations, the continuous video stream is sent and stored at one server facility while the video segments containing motion event candidates are send to and processed at a different server facility.

In some implementations, the smart device sends additional source information 503 to the server system 164. This additional source information 503 may include information regarding a device state (e.g., IR mode, AE mode, DTPZ settings, etc.) and/or information regarding the environment in which the device is located (e.g., indoors, outdoors, night-time, day-time, etc.). In some implementations, the source information 503 is used by the server system 164 to perform event detection and/or to categorize event candidates. In some implementations, the additional source information 503 includes one or more preliminary results from video processing performed by the camera 118 (e.g., categorizations, object recognitions, motion masks, etc.).

In some implementations, the video portion after an event start incident is detected is divided into multiple segments. In some implementations, the segmentation continues until event end information (sometimes also called an "end-of-event signal") is obtained. In some implementations, the segmentation occurs within the server system 164 (e.g., by the event processor module 3146). In some implementations, the segmentation comprises generating overlapping segments. For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real time initial categorization and alerts based on processing the first segment. The initial categorization may then be revised based on processing of subsequent segments. In some implementations, a new segment is generated if the motion entity enters a new zone of interest.

In some implementations, after the event processor module obtains the video portion corresponding to an event candidate, the event processor module 3146 obtains background factors and performs motion entity detection identification, motion vector generation for each motion entity, and feature identification. Once the event processor module 3146 completes these tasks, the event categorizer module 3148 aggregates all of the information and generates a categorization for the motion event candidate. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for a motion event candidate is optionally based on zones of interest involved with the motion event candidate, background features, motion vectors, scene features, entity features, motion features, motion tracks, and the like.

In some implementations, the video source 222 has sufficient processing capabilities to perform, and does perform, the background estimation, motion entity identification, the motion vector generation, and/or the feature identification.

Figure 6:
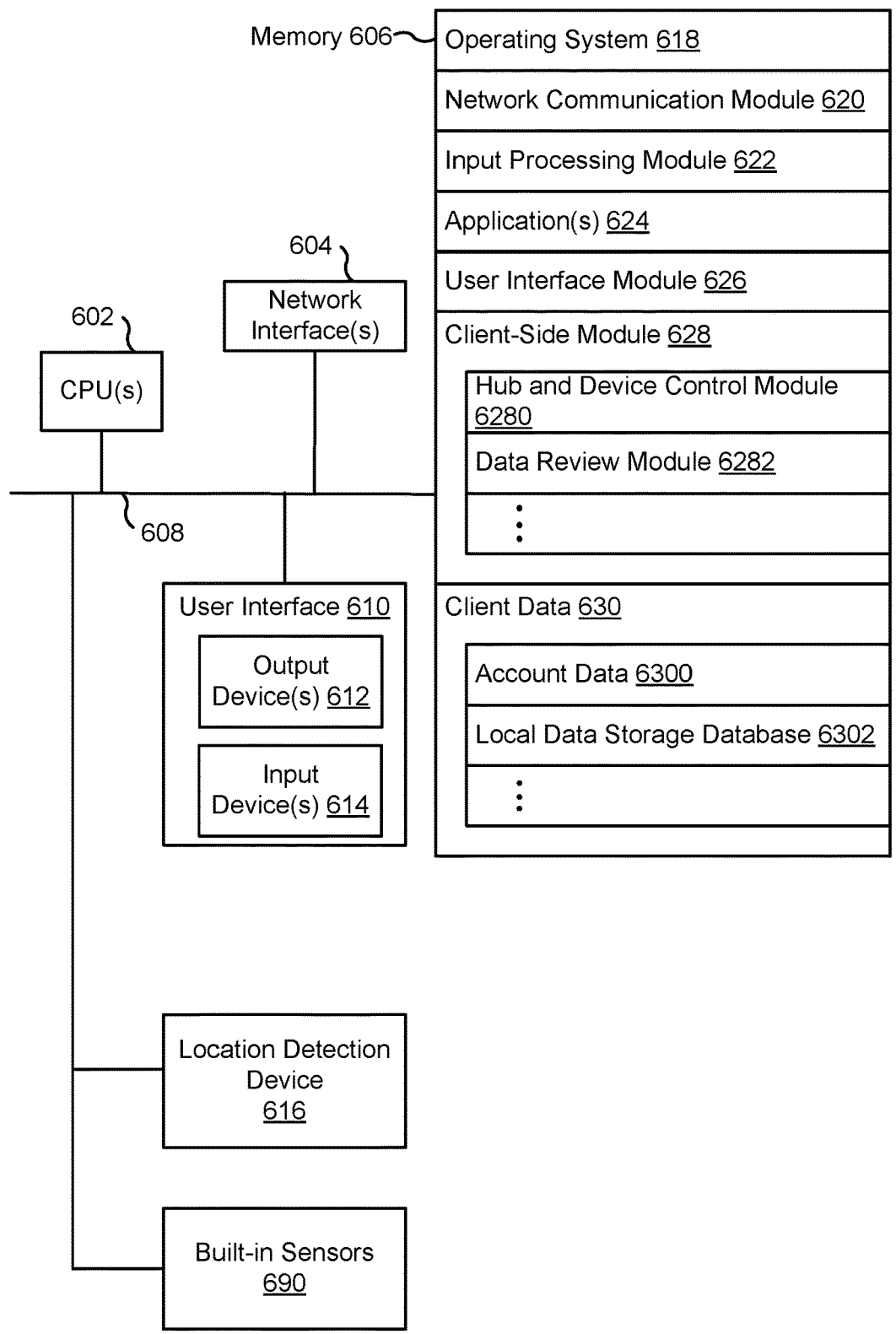
FIG. 6 is a block diagram illustrating a representative client device, in accordance with some implementations.

FIG. 6 is a block diagram illustrating a representative client device 220 associated with a user account in accordance with some implementations. The client device 220, typically, includes one or more processing units (CPUs) 602, one or more network interfaces 604, memory 606, and one or more communication buses 608 for interconnecting these components (sometimes called a chipset). Optionally, the client device also includes a user interface 610 and one or more built-in sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 616, such as a GPS (global positioning satellite) or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;
- a network communication module 620 for connecting the client device 220 to other systems and devices (e.g., client devices, electronic devices, and systems connected to one or more networks 162) via one or more network interfaces 604 (wired or wireless);
- an input processing module 622 for detecting one or more user inputs or interactions from one of the one or more input devices 614 and interpreting the detected input or interaction;
- one or more applications 624 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- a user interface module 622 for providing and displaying a user interface in which settings, captured data, and/or other data for one or more devices (e.g., smart devices 204 in smart home environment 100) can be configured and/or viewed;
- a client-side module 628, which provides client-side functionalities for device control, data processing and data review, including but not limited to:
  - a hub device and device control module 6280 for generating control commands for modifying an operating mode of the hub device or the electronic devices in accordance with user inputs; and
  - a data review module 6282 for providing user interfaces for reviewing data processed by the server system 164; and
- client data 630 storing data associated with the user account and electronic devices, including, but not limited to:
  - account data 6300 storing information related to both user accounts loaded on the client device and electronic devices (e.g., of the video sources 222) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  - a local data storage database 6302 for selectively storing raw or processed data associated with electronic devices (e.g., of the video sources 222, such as a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

Figure 7A:
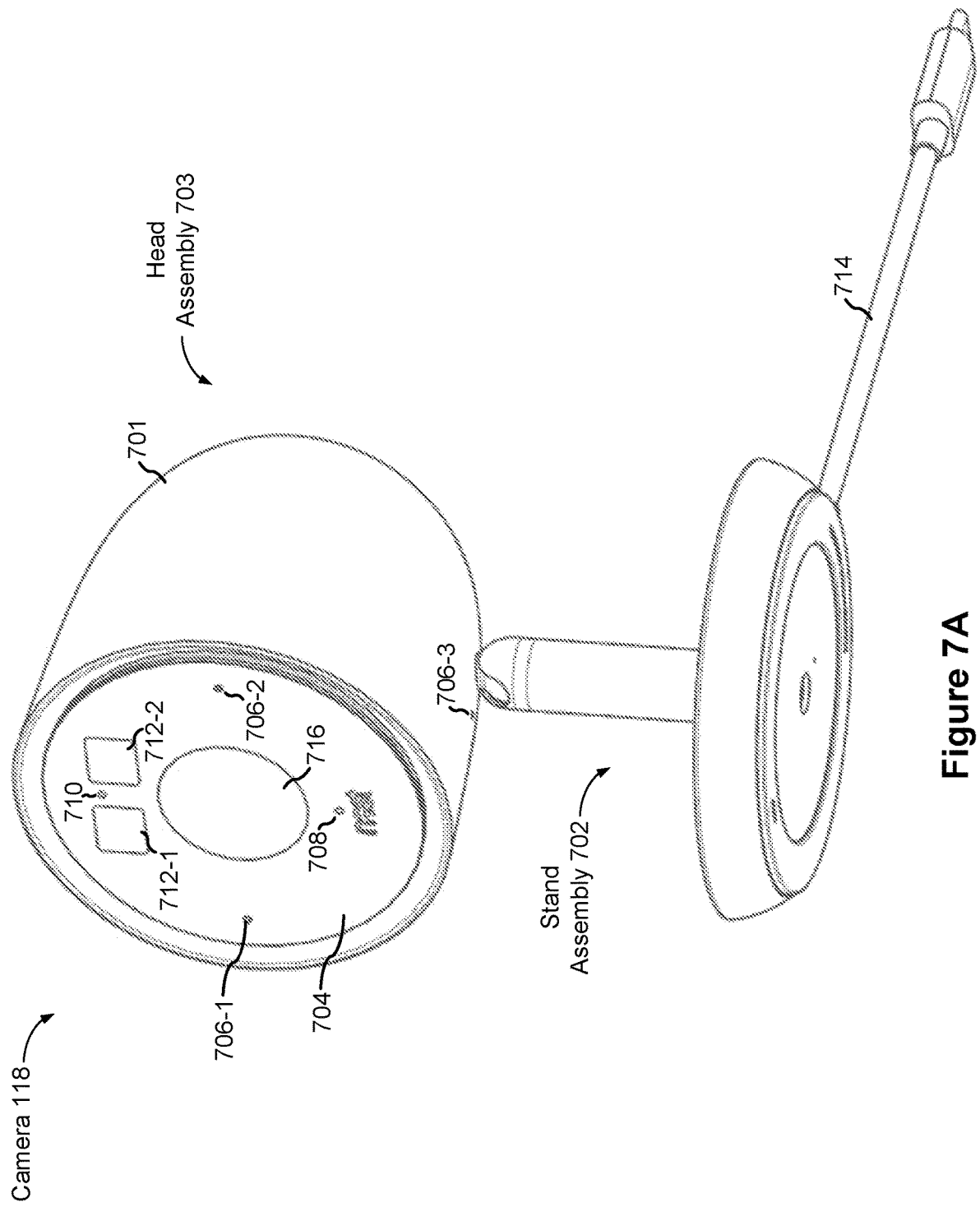
FIGS. 7A-7B are perspective views of a representative camera assembly in accordance with some implementations.
Figure 7B:
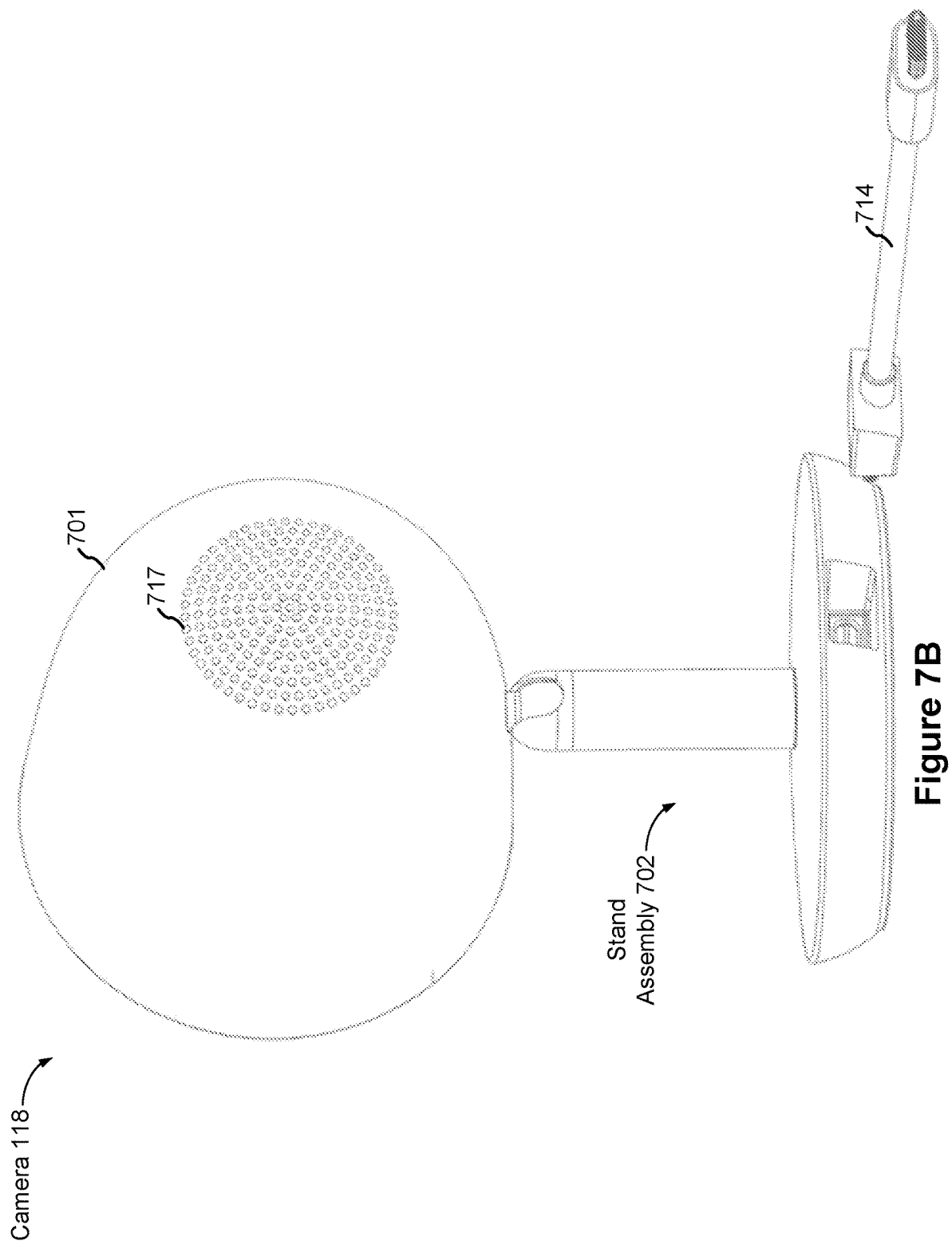

FIGS. 7A-7B are perspective views of a representative camera assembly in accordance with some implementations. FIG. 7A shows a first perspective view of a representative camera 118. As shown in FIG. 7A, the camera 118 includes a head assembly 703, a stand assembly 702, and a cable 714 (e.g., for powering the camera 118 and/or transferring data between the camera 118 and a second electronic device.). The head assembly 703 includes a cover element 704 and a casing 701 (also sometimes called a housing). In accordance with some implementations, the cover element 704 has IR transparent portions 712 for IR illuminators, visible and IR transparent portion 716 for an image sensor, and semi-transparent portions 710 (corresponding to an ambient light sensor) and 708 (corresponding to a status LED). In accordance with some implementations, the cover element 704 also includes apertures 706 for microphones. In accordance with some implementations, the casing 701 includes an aperture 706-3 for a microphone.

In some implementations, the casing 701 has two or more layers. In some implementations, the inner layer is composed of a thermally conductive resin. In some implementations, the outer layer is a structural jacket configured to protect the camera 118 from environmental conditions such as moisture or electromagnetic charge (e.g., static electricity). In some implementations, the structural jacket is configured to protect the camera 118 from impacts, such as from a collision with another object or the ground.

FIG. 7B shows a back view of the camera 118. As shown in FIG. 7B the cable 714 is detachable from the stand assembly 702. For example, a user may store the cable 714 separately from the camera 118 when desired. In accordance with some implementations, the casing 701 includes a plurality of apertures 717 for a speaker.

Figure 7C:
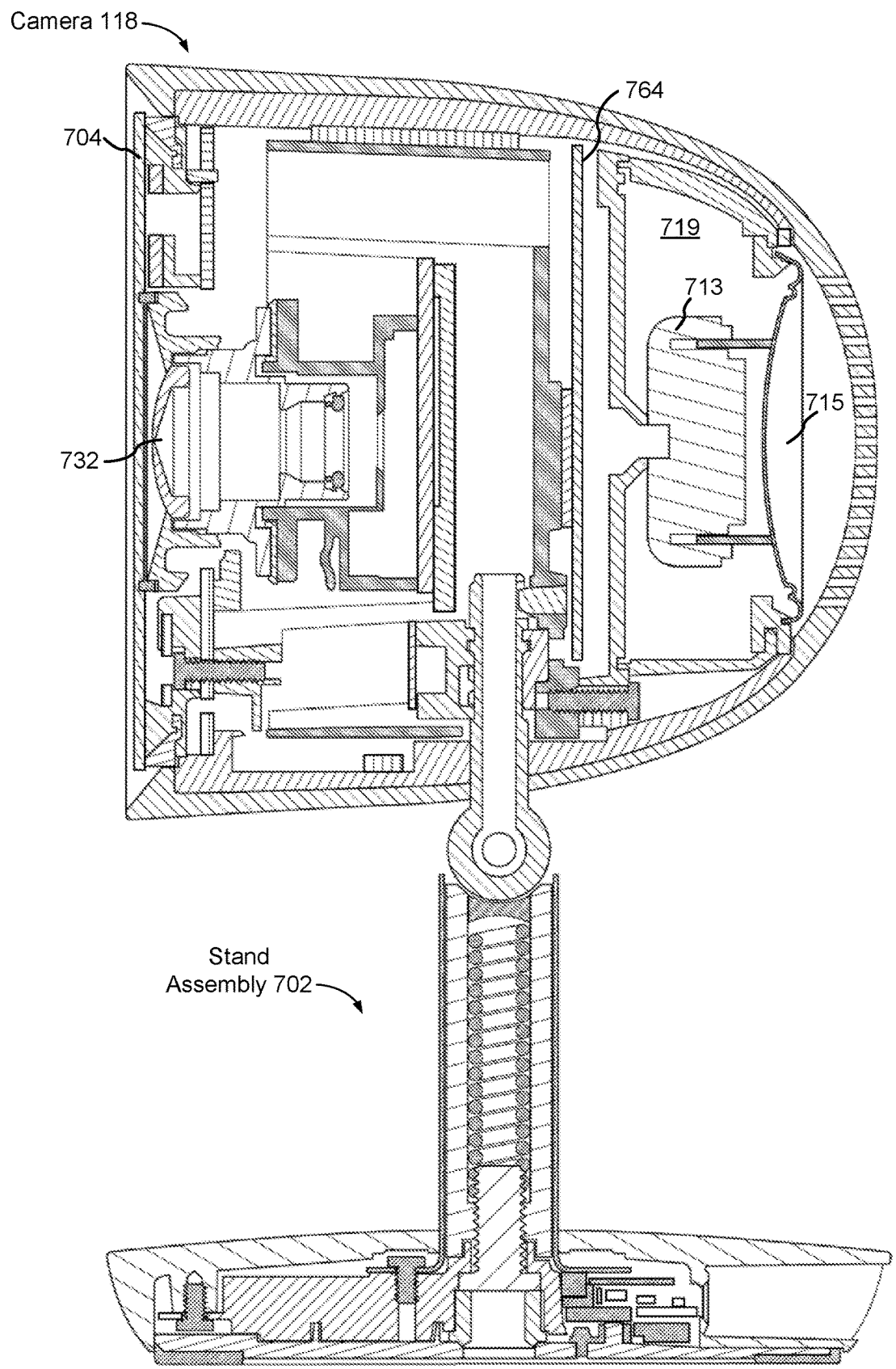
FIGS. 7C-7H are component views of a representative camera assembly in accordance with some implementations.

FIGS. 7C-7H are component views of a representative camera assembly in accordance with some implementations. FIG. 7C shows an interior view of the camera 118 in accordance with some implementations. As shown in FIG. 7C, the camera 118 includes a cover element 704, an image sensor assembly 732, a speaker assembly 713, and a main circuit board 764.

In some implementations, the speaker assembly 713 includes a speaker 715 and a heat sink 719. In some implementations, the heat sink 719 is configured to dissipate heat generated at the main board 764. In some implementations, the speaker assembly 713 acts as a heat sink for the camera's system-on-a-chip (SoC) 1004, shown in FIG. 10A. In some implementations, the SoC 1004 is thermally coupled to the speaker assembly 713 with a thermal pad 1002, shown in FIG. 10A. In some implementations, the thermal pad's area is smaller than the speaker assembly's bottom surface 799, shown in FIG. 7F. For optimal heat dissipation it is beneficial to spread the heat from the thermal pad over the entire bottom surface of the speaker assembly. In some implementations, a thermally graphite sheet (e.g., thermally conductive sheet 766, FIG. 7F) is used to achieve this spreading since graphite has very high in-plane thermal conductivity.

In some implementations, the camera 118 is a video streaming device with powerful computing capability embedded in the device. Therefore, in some instances, it will consume a lot of power and will also generate a lot of heat. In order to prevent the chipset and other components from being damaged by the heat, a thermal relief solution includes directing the heat from the CPU (e.g., a CPU of SoC 1004, FIG. 10A) to the speaker assembly 713. In some implementations, the speaker assembly 713 is composed of a thermally conductive plastic that is structurally suitable and has good heat spreading properties. In some implementations, a thermal pad 1002 on top of the shield can is used to direct the heat to the speaker assembly. To further distribute the heat onto the speaker, in some implementations, a graphite sheet is placed on the bottom surface of the speaker assembly. In some implementations, the size of the graphite sheet is maximized to achieve the best thermal relief function.

Figure 7D:
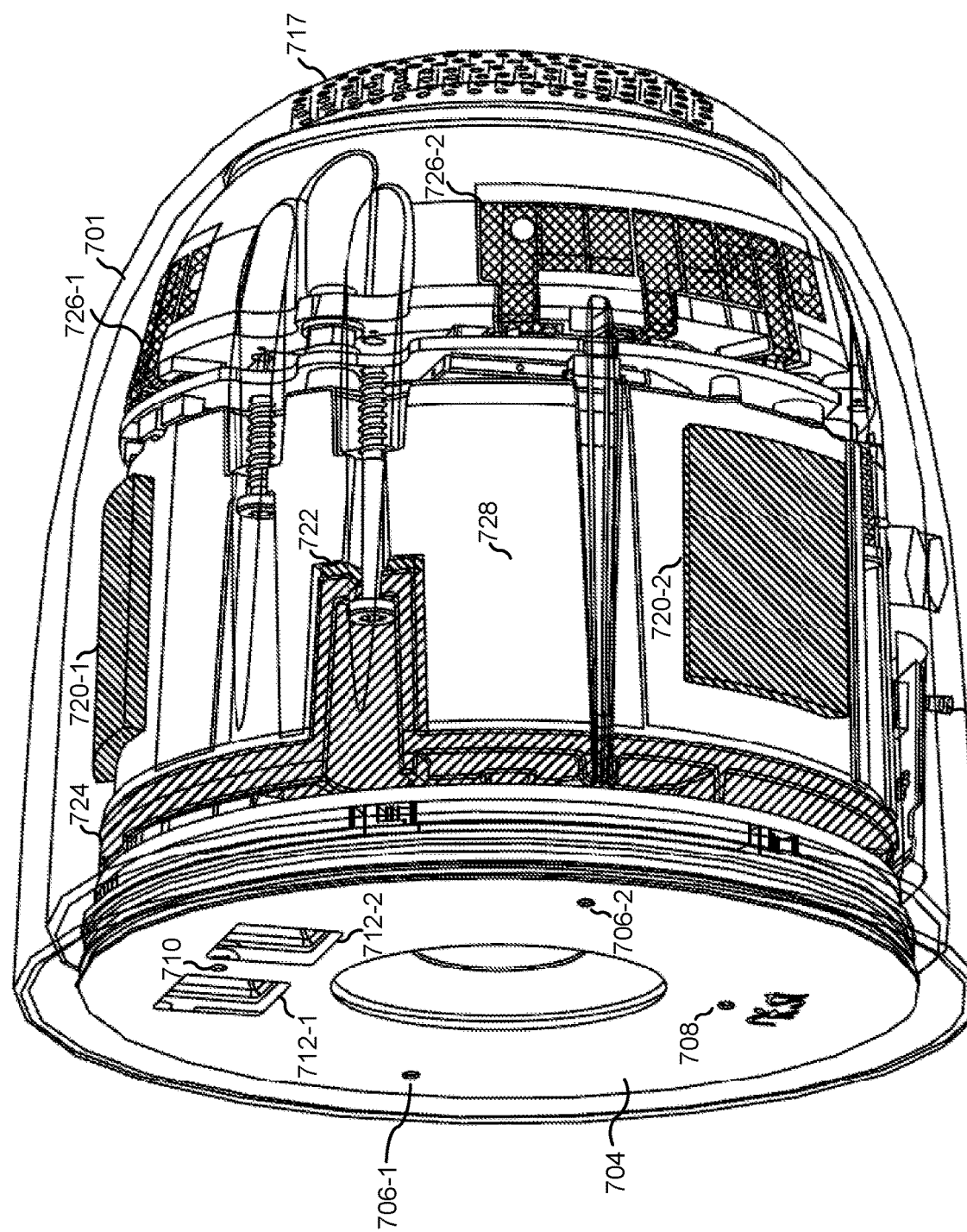

FIG. 7D shows another interior view of the camera 118 in accordance with some implementations. As shown in FIG. 7D, the camera 118 includes the cover element 704 having the IR transparent portions 712 for IR illuminators, the apertures 706 for microphones, the semi-transparent portion 708 corresponding to a status LED, and the semi-transparent portion 710 corresponding to an ambient light sensor. The camera 118 also includes a plurality of heat pads 720 for dissipating heat from the main board 764 and a thermal receiver structure 728 (e.g., having a shape like that of a fryer pot, hereinafter referred to as "fryer pot 728") to the casing 701, a plurality of antennas 726 for wirelessly communicating with other electronic devices, a thermal mount structure 724 (e.g., having a shape like that of a fryer basket, hereinafter referred to as "fryer basket 724") for dissipating and transferring heat from the image sensor assembly 732 to the cover element 704, and pads 722 for thermally isolating the fryer basket 724 from the fryer pot 728.

In some implementations, the heat pads 720 are adapted to transfer heat from the fryer pot 728 to the casing 701. In some implementations, the heat pads 720 are adapted to thermally couple an inner layer of the casing 701 and the fryer pot 728. In some implementations, the heat pads 722 are composed of a plastic. In some implementations, the heat pads 722 are adapted to thermally de-couple the fryer basket 724 from the fryer pot 728.

In some implementations, the fryer basket 724 is composed of magnesium. In some implementations, the fryer basket 724 is adapted to dissipate heat from the image sensor assembly 732. In some implementations, the fryer basket 724 is adapted to provide structural support to the camera 118. In some implementations, the fryer basket 724 is adapted to protect the image sensor assembly 732 from environmental forces such as moisture and/or impact from objects and/or the ground.

In some implementations, the antennas 726 are configured to operate concurrently using two distinct frequencies. In some implementations, the antennas 726 are configured to operate concurrently using two distinct communication protocols. In some implementations, one or more of the antennas 726 is configured for broadband communications (e.g., Wi-Fi) and/or point-to-point communications (e.g., Bluetooth). In some implementations, one or more of the antennas 726 is configured for mesh networking communications (e.g., ZWave). In some implementations, a first antenna 726 (e.g., antenna 726-1) is configured for 2.4 GHz Wi-Fi communication and a second antenna 726 (e.g., antenna 726-2) is configured for 5 GHz Wi-Fi communication. In some implementations, a first antenna 726 (e.g., antenna 726-1) is configured for 2.4 GHz Wi-Fi communication and point-to-point communication, a second antenna 726 (e.g., antenna 726-2) is configured for 5 GHz Wi-Fi communication and point-to-point communication, and a third antenna 726 (e.g., antenna 726-3) is configured for mesh networking communication. In some implementations, two or more of the antennas 726 are configured to transmit and/or receive data concurrently with others of the antennas 726.

MIMO (multi input multi output) provides the benefit of greater throughput and better range for the wireless communication. One of the parameters in the antenna system is the isolation between two antennas. Better isolation can ensure the data transmitted through two antennas are uncorrelated which is the key to the MIMO system. One way to achieve good isolation is to have large antenna separations. However, in modern consumer electronics the space left for antennas is very tight so having enough spacing between antennas is infeasible. While isolation is important, the antenna efficiency cannot be sacrificed.

Isolation is directly related to how much energy is coupled from one antenna to another. The Friis equation defines the power received by another antenna as inversely proportional to $(1/R)^2$, where R is the distance between two antennas. So increasing antenna spacing is one effective way to achieve good isolation. Another means to achieve isolation is through use of a decoupling network. For example, an artificial coupling channel is generated in additional to its original coupling channel (e.g., which is through air). By properly managing the two coupling channels, the good isolation can be achieved.

In some implementations, the antennas 726 include at least one dual-band Inverted-F Antenna (IFA). In some implementations, the antennas are made by FPC, LDS, Stamping, or other state of art antenna manufacturing technology. In some implementations, the fryer pot 728 is a system ground for one or more of the antennas 726. In some implementations, the size of the antenna is about quarter-wavelength at 2.4 GHz. In some implementations, each antenna includes a radiating element, a feed line, and a ground stub. The ground stub presents an inductance to compensate for capacitance generated between the radiating element and the fryer pot 728. In some implementations, at least one of the antennas 726 includes a second ground stub. The second ground stub is adapted to match the antenna to both 2.4 GHz and 5 GHz. In some implementations, the antenna feed is the feeding point for the 2.4 GHz and 5 GHz WiFi signal. In some implementations, the feed point is connected to the output of a WiFi chip. In some implementations, the antennas 726 include two identical IFA antennas. Both antennas are attached to the speaker assembly 713.

In some implementations, at least one of the antennas 726 includes a second type of antenna having first radiating element, a second radiating element, a first ground stub, and second ground stub. In some implementations, the size of the first radiating element is around quarter wavelength of 5 GHz. In some implementations, the resonance frequency at 2.4 GHz is determined by: (i) the size of the second radiating element, (ii) the position of the first ground stub, and (iii) the position of the second ground stub. In some implementations, the first ground stub is placed at a pistol end of the second radiating element. In some implementations, the second ground stub is between the first radiating element and the first ground stub. In some implementations, the position where second ground stub is attached to the second radiating element is adjusted to tune to the resonant frequency at 2.4 GHz. In some implementations, the first ground stub not only acts as part of the antenna, but also a shielding element that can reduce coupling coming from the left-handed side of the first ground stub. In some implementations, the second ground stub is also a shielding element to further reduce the coupling coming from the left handed side of the antenna. In some implementations, the second type of antenna includes more than 2 ground stubs. By using more ground stubs the antenna's physical size can be enlarged while maintaining the same resonant frequency (e.g., 2.4 GHz). In some implementations, the first and second ground stubs are on the right-handed side of the first radiating element to reduce coupling coming from the right-handed side. In some implementations, the antennas 726 include one or more antennas of a first type (e.g., IFAs) and one or more antennas of the second type.

By using a set of antennas including both a first type of antenna (e.g., an IFA) and the second type of antenna, two antennas can be positioned in a tight space while maintaining both good efficiency and good isolation between them. This enables the camera 118 to be compact without sacrificing the quality of wireless connectivity. In some implementations, both types of antennas are manufactured by conventional FPC technology with low cost. Unlike an antenna system relying on a decoupling system to achieve a similar isolation level, the IFA and second type antennas can be optimized and/or tuned independently.

Figure 7E:
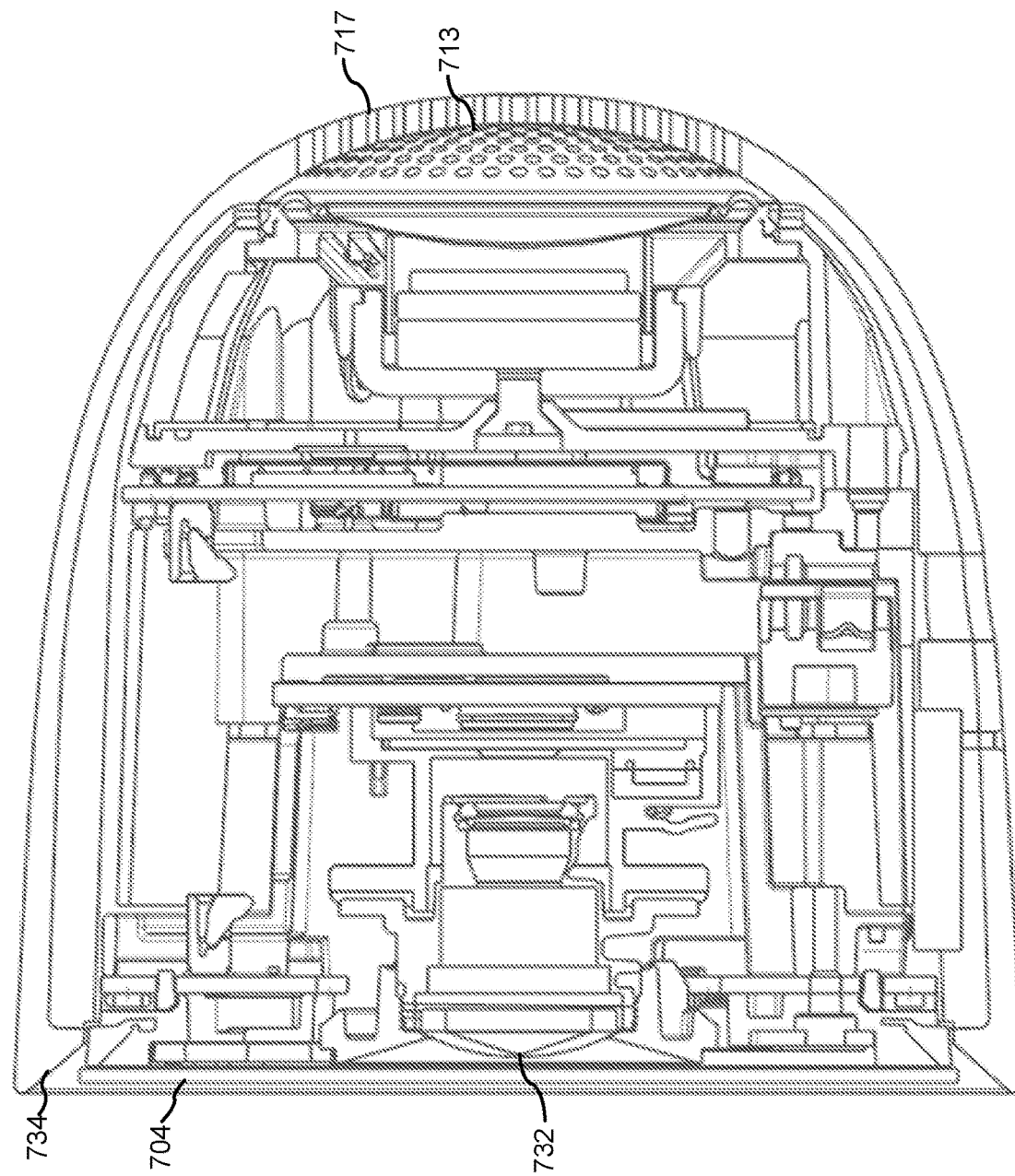

FIG. 7E shows another interior view of the camera 118 in accordance with some implementations. As shown in FIG. 7E, the camera 118 includes the cover element 704, casing 701 with speaker holes 717, the image sensor assembly 732, and a speaker assembly 713. In some implementations, as shown, the speaker holes 717 extend directly outward from the speaker, which results in holes with an elliptical outer surface. In some implementations, the speaker holes 717 are parallel to one another. In some implementations, the speaker holes 717 extend outward at an angle consistent with the rear surface of the casing 701 such that the holes have a circular, rather than elliptical, outer surface (not shown). The camera 118 also includes a light guide 734 for directing light from a light assembly out the face of the camera 118.

Figure 7F:
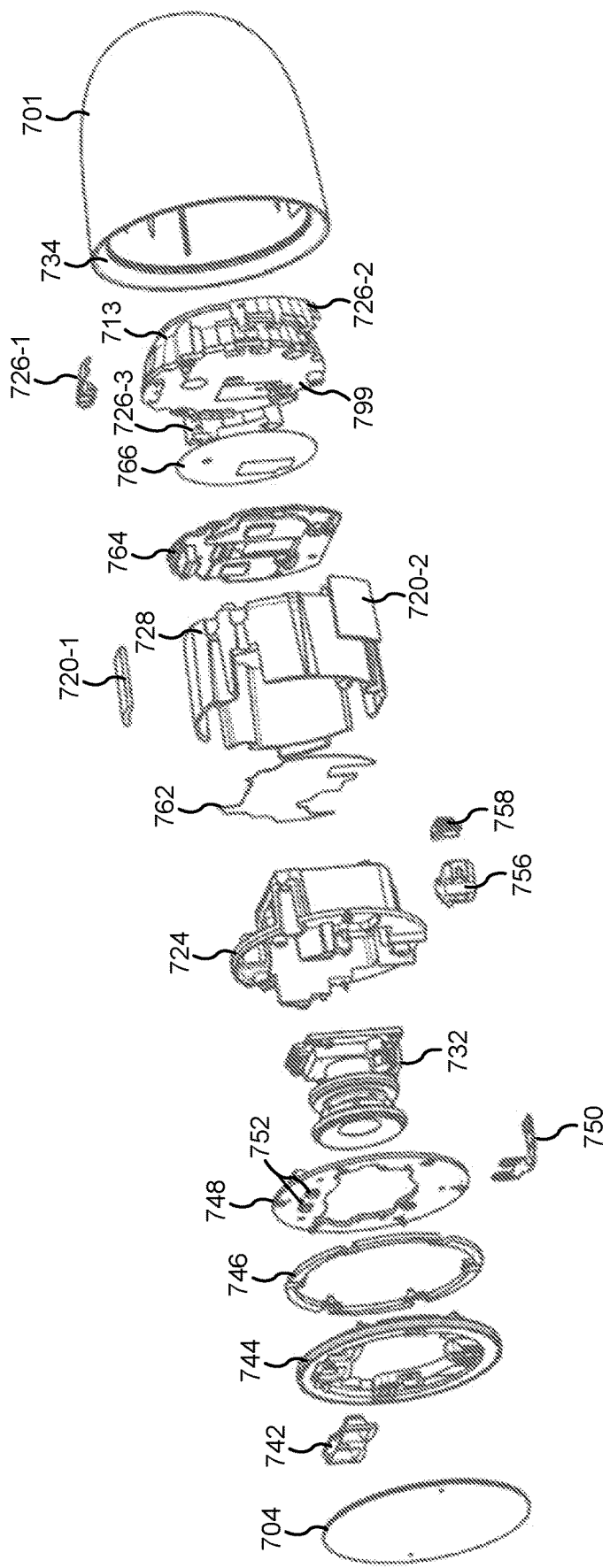

FIG. 7F shows an expanded view of the camera 118 in accordance with some implementations. As shown in FIG. 7F, the camera 118 includes cover element 704, an infrared (IR) reflector 742, a light diffuser 744, a light guide 746, a light ring 748, a microphone assembly 750, the image sensor assembly 732, the fryer basket 724, stand coupling elements 756 and 758, the fryer pot 728, a thermal insulator 762 adapted to thermally isolate the fryer pot 728 from the fryer basket 724, the main board 764, the thermally conductive sheet 766, the antennas 726, the speaker assembly 713, and the casing 701. In accordance with some implementations, the casing 701 has a lip 734 for reflecting and directing light from the light diffuser 744 outward from the face of the camera 118.

In some implementations, the cover element 704 comprises a chemically-strengthened glass. In some implementations, the cover element 704 comprises a soda-lime glass.

In some implementations, the image sensor assembly 732 includes a circuit board (e.g., a PCB board), an IR cut filter, a lens holder, and an image sensor. In some implementations, the image sensor comprises a 4 k image sensor. In some implementations, the image sensor comprises a 12 megapixel sensor. In some implementations, the image sensor comprises a wide-angle lens.

In some implementations, the thermally conductive sheet 766 is adapted to dissipate heat generated by the main board 764 and/or transfer heat from the main board 764 to the speaker assembly 713 for subsequent dissipation outside of the camera via the rear portion of the casing 701. In some implementations, the conductive sheet 766 is a graphite sheet. When a graphite sheet is placed near the antenna system with multiple antennas, it can create a coupling medium between antennas. The increased coupling caused by the graphite can decrease the isolation between two antennas, thus degrading antenna efficiency or causing permanent damage to the chipset.

In some implementations, the antennas 726 are configured to enable the camera 118 to wirelessly communication with one or more other electronic devices, such as a hub device 180, a smart device 204, and/or a server system 164.

In some implementations, the fryer pot 728 is composed of magnesium. In some implementations, the fryer pot 728 is adapted to provide structural support to the camera 118.

In some implementations, the fryer pot 728, the main board 764, the conductive sheet 766, the speaker assembly 713, and the antennas 726 comprise a rear sub-assembly. Thermally de-coupling the fryer basket 724 from the fryer pot 728 prevents heat generated by the main board 764 from interfering with the image sensor assembly 732. In accordance with some implementations, heat generated by the front of the main board 764 is transferred to the fryer pot 728 to the heat pads 720 and dissipated outside of the camera via the casing 701 (e.g., the sides of the casing). In accordance with some implementations, heat generated by the back of the main board 764 is transferred to the thermally conductive sheet 766 to the speaker assembly 713 and dissipated outside of the camera via the back portion of the casing 701.

In some implementations, the rear sub-assembly is affixed to the casing 701 via one or more fasteners (e.g., via 2-3 screws). In some implementations, the cover element 704, the infrared reflector 742, the light diffuser 744, the light guide 746, the light ring 748, and the image sensor assembly 732 comprise a front sub-assembly. In some implementations, the front sub-assembly is affixed to the casing 701 via one or more fasteners (e.g., 2-3 screws). In some implementations, the front sub-assembly is affixed to the rear sub-assembly via one or more fasteners.

In some implementations, the fryer basket 724 is adapted to dissipate heat generated by the image sensor assembly 732 and/or the light ring 748. In some implementations, the fryer basket 724 includes one or more forward-facing microphones. In some implementations, the downward-facing microphone 750 is operated in conjunction with the microphones on the fryer basket 724 to determine directionality and/or location of incoming sounds.

In some implementations, the IR reflector 742 is coated with an IR and/or visible light reflective coating. In some implementations, the IR reflector 742 is adapted to direct light from the IR illuminators 752 to a scene corresponding to a field of view of the image sensor assembly 732.

In some implementations, the light ring 748 comprises a plurality of visible light illuminators (e.g., RGB LEDs), a plurality of IR illuminators 752, and circuitry for powering and/or operating the visible light and/or IR illuminators. In some implementations, the light guide 746 is adapted to direct light from the visible light illuminators out the face of the camera 118. In some implementations, the light guide 746 is adapted to prevent light from the visible light illuminators from entering the image sensor assembly 732. In some implementations, the light guide 746 is adapted to spread the light from the visible light illuminators in a substantially even manner. In some implementations, the light guide 746 is composed of a clear material. In some implementations, the light guide 746 is composed of a poly-carbonite material. In some implementations, the light guide 746 has a plurality of dimples to refract the light from the illuminators and prevent the light from entering the image sensor assembly 732. In some implementations, the light guide 746 is adapted to provide more uniform color and light output to a user from the illuminators. In some implementations, the light guide 746 includes a plurality of segments, each segment corresponding to a visible light illuminator. In some implementations, the light guide 746 includes one or more light absorbing elements (e.g., black stickers) arranged between each segment to prevent light leakage from one illuminator segment to another illuminator segment.

In some implementations, the light diffuser 744 includes two or more sections (e.g., an inner section and an outer section). In some implementations, the light diffuser 744 is adapted to diffuse the light from the visible light illuminators. In some implementations, the light diffuser 744 is adapted to direct the light from the illuminators toward the lip 734 of the casing 701. In some implementations, the light ring 748 (and corresponding elements such as the light guide 746 and/or light diffuser 744) causes a circular colored (or white) light to be emitted from the front of the camera 118.

In some implementations the components and corresponding light are circular and arranged around the periphery of the front of the camera 118. They may encircle all or substantially all elements of the camera 118, such as the image sensor assembly 732, the IR illuminators 752, the ambient light sensor 751, a status LED, and the microphone apertures 706. In other implementations, they are arranged not around the periphery but rather at an inner diameter, e.g., around only the image sensor assembly 732. In yet other implementations, they do not surround any front-facing element of the camera 118. In some implementations, they are arranged in a non-circular shape, such as a square, oval, or polygonal shape. In some implementations, they are not arranged on the front of the device but rather a different surface of the device, such as the bottom, top, sides, or back. In some implementations, multiple such light rings and components are arranged onto the same or different surfaces of the camera 118.

The light ring 748 (and corresponding elements) may operate to indicate a status of the camera 118, another device within or outside of the smart home environment 100 (e.g., another device communicatively coupled either directly or indirectly to the camera 118), and/or the entire connected smart home environment 100 (e.g., system status). The light ring 748 (and corresponding elements) may cause different colors and/or animations to be displayed to a user that indicate such different statuses.

For example, in the context of communicating camera 118 status, when the camera 118 is booting for the first time or after a factor reset, the ring may pulse blue once at a slow speed. When the camera 118 is ready to begin setup, the ring may breathe blue continually. When the camera 118 is connected to a remote cloud service and provisioning is complete (i.e., the camera is connected to a user's network and account), the ring may pulse green once. When there is a service connection and/or provisioning failure, the ring may blink yellow at a fast speed. When the camera 118 is being operated to facilitate two-way talk (i.e., audio is captured from the audio and communicated to a remote device for output by that remote device simultaneously with audio being captured from the remote device and communicated to the camera 118 for output by the camera 118), the ring may breathe blue continuously at a fast speed. When the camera 118 is counting down final seconds before a factory reset, the ring may close on itself at a rate equal to the time until reset (e.g., five seconds). When the camera 118 has been factory and while the setting are being erased the ring may rotate blue continuously. When there is insufficient power for the camera 118 the ring may blink red continuously at a slow speed. The visual indications are optionally communicated simultaneously, concurrently, or separately from audio indications that signal to the user a same or supplemental message. For example, when the camera 118 is connected to a remote cloud service and provisioning is complete (i.e., the camera is connected to a user's network and account), the ring may pulse green once and output an audio message that "remote cloud service and provisioning is complete."

Additionally or alternatively, the camera 118 may communicate the status of another device in communication with the camera 118. For example, when a hazard detector 104 detects smoke or fire sufficient to alarm, the camera 118 may output a light ring that pulses red continuously at a fast speed. When a hazard detector 104 detects smoke or fire sufficient to warn a user but not alarm, the camera 118 may output a light ring that pulses yellow a number of times. When a visitor engages a smart doorbell 106 the camera 118 may output a light ring depending on the engagement; e.g., if the smart doorbell 106 detects motion, the camera 118 may output a yellow light ring, if a user presses a call button on the smart doorbell 106, the camera 118 may output a green light ring. In some implementations, the camera 118 may be communicatively coupled to the doorbell 106 to enable audio communication therebetween, in which case an animation and/or color of the light ring may change depending on whether the user is speaking to the visitor or not through the camera 118 or another device.

Additionally or alternatively, the camera 118 may communicate the cumulative status of a number of network-connected devices in the smart home environment 100. For example, a smart alarm system 122 may include proximity sensors, window break sensors, door movement detectors, etc. A whole home state may be determined based on the status of such a plurality of sensors/detectors. For example, the whole home state may be secured (indicating the premises is secured and ready to alarm), alarming (indicating a determination that a break-in or emergency condition exists), or somewhere in between such as pre-alarming (indicating a determination that a break-in or emergency condition may exist soon or unless some condition is satisfied). For example, the camera 118 light ring may pulse red continuously when the whole home state is alarming, may pulse yellow when the whole home state is pre-alarming, and/or may be solid green when the whole home state is secured. In some implementations, such visual indications may be communicated simultaneously (or separately from) with audio indications that signal to the user the same or supplemental message. For example, when the whole home state is alarming, the ring may pulse red once and output an audio message that indicates the alarm "alarm". In some implementations, the audio message may provide supplemental information that cannot be conveyed via the light ring. For example, when the whole home state is alarming due to a basement window being broken, the audio message may be "alarm—your basement window has been broken." For another example, when a pre-alarm amount of smoke has been detected by a hazard detector 104 located in the kitchen, the audio message may be "warning—smoke is detected in your kitchen."

In some implementations, the camera 118 may also or alternatively have a status LED. Such a status LED may be used to less-instructively communicate camera 118, other device, or multiple device status information. For example, the status light may be solid green during initial setup, solid green when streaming video and/or audio data normally, breathing green when someone is watching remotely, solid green when someone is watching remotely and speaking through the camera 118, and off when the camera 118 is turned off or the status LED is disabled. It should be appreciated that the status LED may be displayed simultaneously with the light ring. For example, the status LED may be solid green during setup while the light ring breathes blue, until the end of setup when the device is connected to the service and provisioning is complete whereby the status LED may continue to be solid green while the light ring switches to a single pulse green.

Figure 7G:
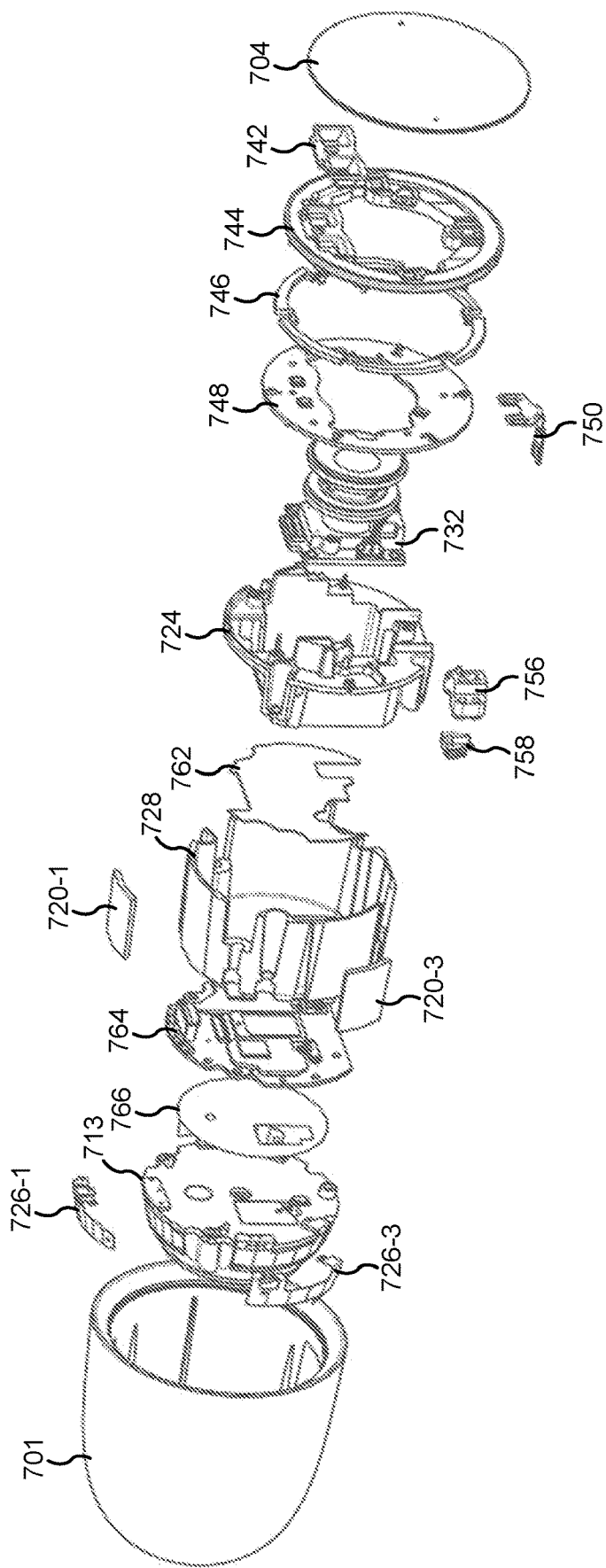
Figure 7H:
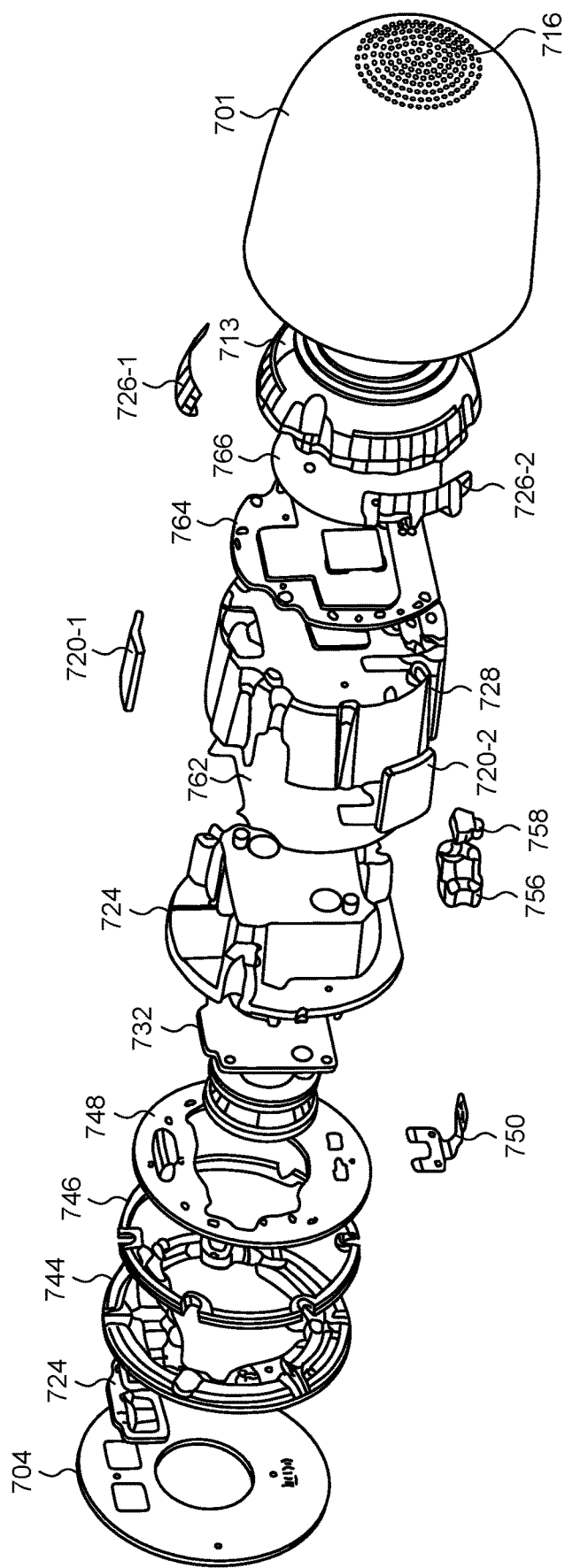

FIGS. 7G and 7H show other expanded views of the camera 118 in accordance with some implementations. As shown in FIGS. 7G and 7H, the camera 118 includes the cover element 704, the infrared reflector 742, the light diffuser 744, the light guide 746, the light ring 748, the microphone assembly 750, the image sensor assembly 732, the fryer basket 724, the stand coupling elements 756 and 758, the fryer pot 728, the main board 764, the conductive sheet 766, the antennas 726, the speaker assembly 713, and the casing 701.

Figure 8A:
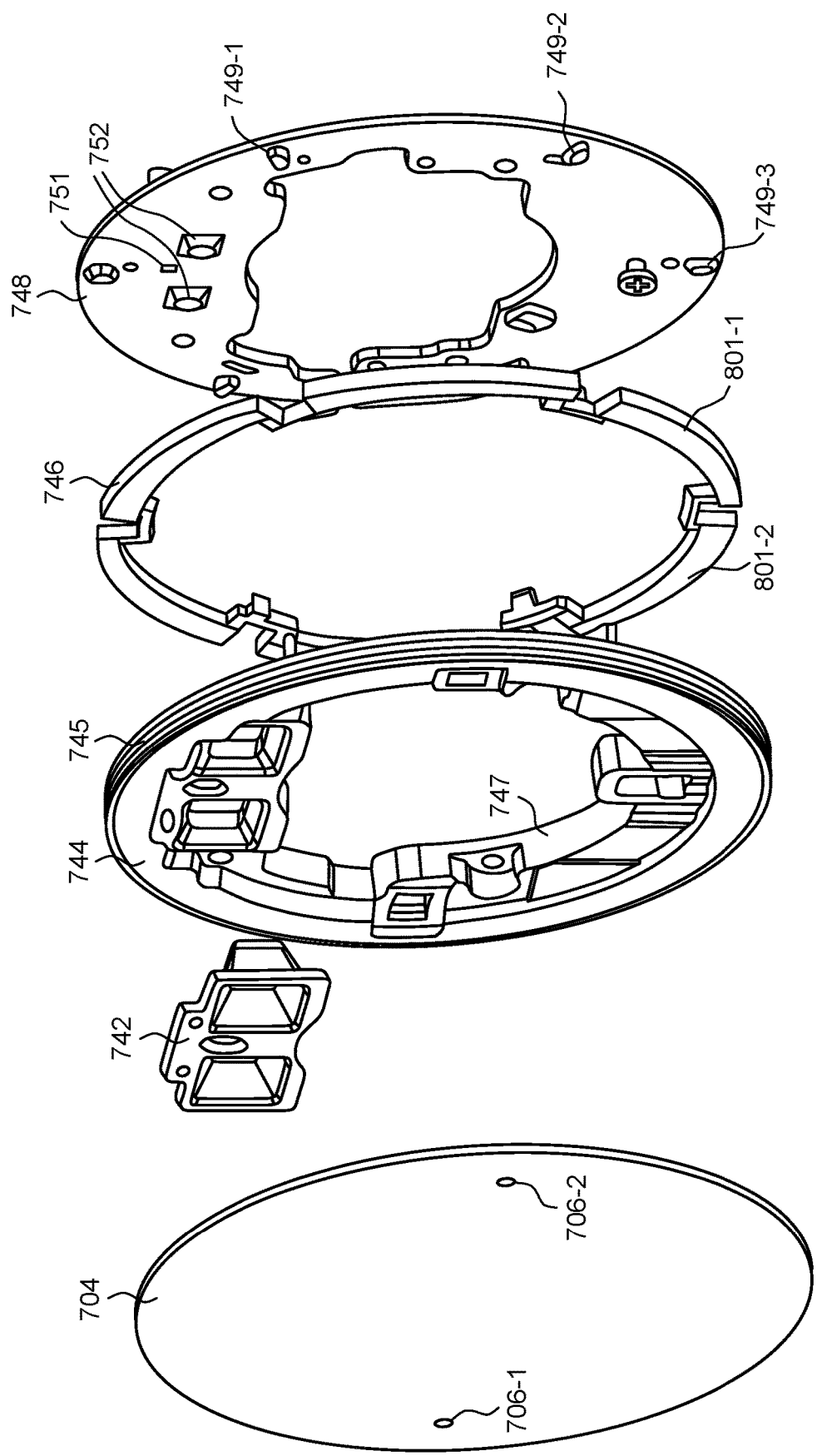
FIGS. 8A-8C are component views illustrating a representative camera assembly in accordance with some implementations.
Figure 8B:
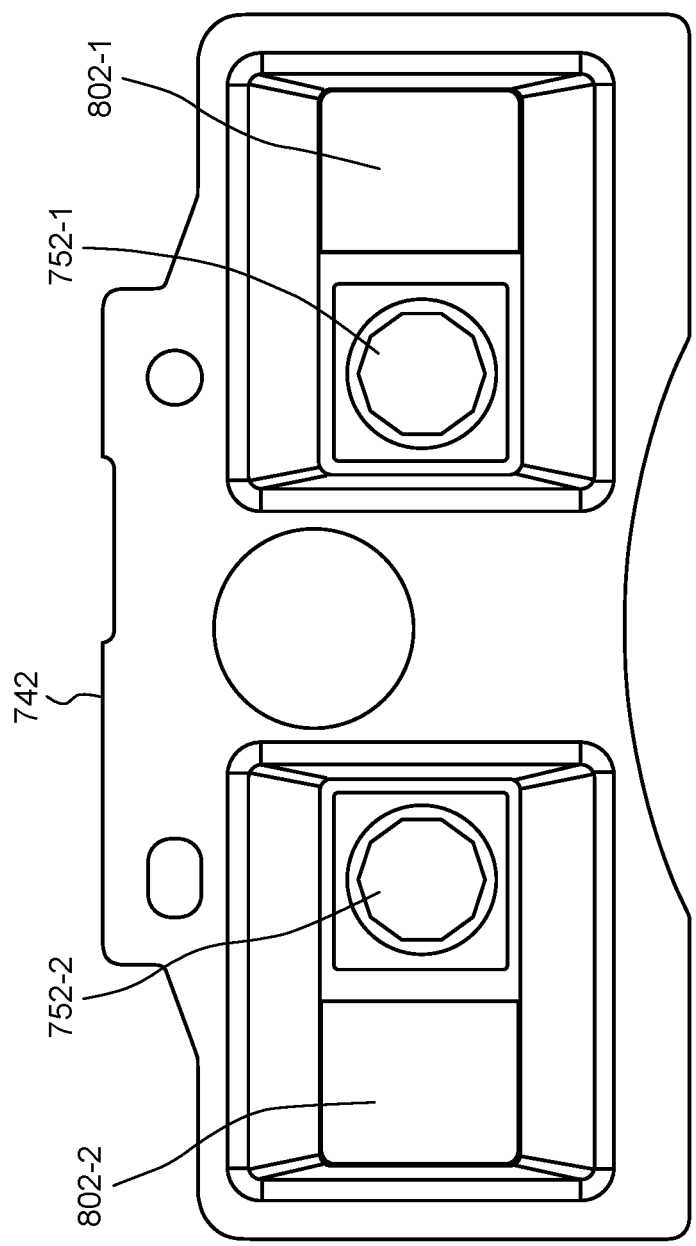
Figure 8C:
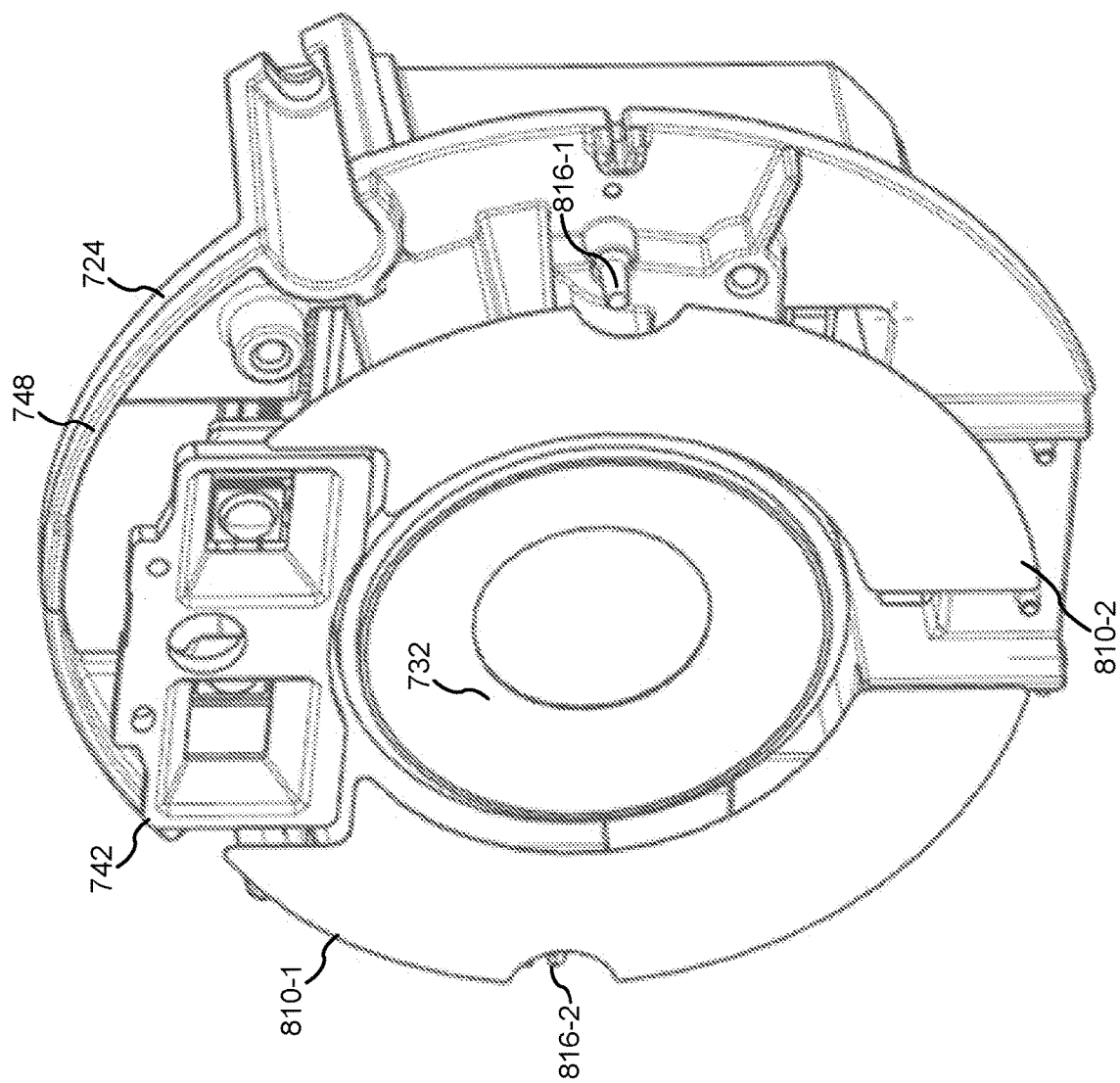

FIGS. 8A-8C are component views illustrating a representative camera assembly in accordance with some implementations. FIG. 8A shows an expanded view of a cover element assembly composed of the cover element 704, the IR reflector 742, the light diffuser 744, the light guide 746, and the light ring 748. In accordance with some implementations, the cover element 704 includes microphone apertures 706. In accordance with some implementations, the light diffuser 744 includes a first (inner) section 747 and a second (outer) section 745. In some implementations, the inner section 747 is comprised of structural poly-carbonite. In some implementations, the outer section 745 is transparent or semi-transparent to visible light. In accordance with some implementations, the light ring 748 includes IR illuminators (e.g., IR LEDs) 752, visible light illuminators (e.g., RGB LEDs) 749, and an ambient light sensor 751. In some implementations, the visible light illuminators 749 comprise 6 RGB LEDs. In some implementations, the visible light illuminators 749 are configured to be controlled individually (e.g., controlled by the SoC 1004). In some implementations, each illuminator corresponds to a portion of the light guide 746. For example, the light guide 746 in FIG. 8A includes a first portion 801-1 corresponding to the illuminator 749-2 and a second portion 801-2 corresponding to the illuminator 749-3. As shown in FIG. 8A, in accordance with some implementations, each illuminator 749 is oriented in a clockwise manner and the light guide 746 includes a corresponding portion extending from the location of the illuminator 749 in a clockwise direction. In some implementations, each portion of the light guide 746 ends with, or is bounded by, a segmentor (e.g., a light-absorbing substance) that is adapted to prevent light from the illuminator from entering other portions of the light guide. In some implementations, one or more surfaces of the light guide 746 not facing the front of the camera are coated or otherwise treated with a light absorbing substance (e.g., a black ink) to prevent light from the illuminators 749 from exiting the light guide 746 at that location. In some implementations, the illuminators 749 are in a non-clockwise (e.g., counter-clockwise) orientation.

In some implementations, the IR illuminators comprise IR LEDs having a wavelength of 940 nanometers. In some implementations, the IR illuminators comprise IR LEDs having a wavelength of 850 nanometers. In some implementations, the image sensor for the camera 118 is less sensitive to 940 nm light than it is to 850 nm light. Therefore, IR LEDs having a 940 nm wavelength cause less interference with the image sensor than IR LEDs having an 850 nm wavelength.

In some implementations, the cover element 704 consists of a single-piece element (e.g., a glass or plastic lens) that resides over the entire front of the camera, including both the image sensor assembly 732 and the IR illuminators 752. In some implementations, the cover element 704 is a single-piece cover glass having a thickness of 1 mm, or approximately 1 mm. One problem with a single-piece element is IR light entering the element at an angle, scattering, and exiting the element into the image sensor. This creates a white ghost effect, increases noise, and reduces visibility of the intended field of view. The result is poor night vision performance. In some implementations, a light absorbing coating (e.g., a film or ink) and anti-reflective coating is added onto the rear of the element to prevent the light scattering. In some implementations, this coating is located between the area used for IR illumination and the image sensor entrance, all on the same piece of cover element. In some implementations, the coating comprises a smooth, matte ink that is light absorbing across all wavelengths of light.

In some implementations, the cover element 704 includes a silkscreen logo. In some implementations, a first section of the cover element 704 is coated with an opaque film adapted to absorb visible and IR light. In some implementations, the film is an ink. In some implementations, second sections of the cover element 704 (e.g., corresponding to the IR illuminators 752) are coated with an IR transparent film adapted to absorb visible light (e.g., is opaque or semi-opaque to visible light). In some implementations, third sections of the cover element 704 are coated with a film that is semi-transparent (e.g., semi-transparent to IR and/or visible light), the third sections corresponding to a status illuminator and/or an ambient light sensor. In some implementations, the cover element 704 is coated with an anti-reflection coating. For example, the cover element 704 is coated first with the thin films then with the anti-reflection coating on top of the thin films. In some implementations, the coatings are applied to the inner surface of the cover element 704. In some implementations, at least one of the coatings is applied to the outer surface of the cover element 704. In some implementations, the cover element 704 has an anti-reflection coating applied to both the inner and outer surfaces. In some implementations, the cover element 704 includes an opaque coating to prevent, or substantially prevent, light from the light ring 748 from entering the image sensor.

In some implementations, one or more of the coatings comprise a smooth ink adapted to absorb, not scatter, light. For example, an opaque ink adapted to absorb visible and IR light. In some implementations, one or more of the coatings are adapted to absorb at least 99% of the light. For example, the opaque coating is adapted to absorb at least 99% of visible and IR light. In some implementations, one or more of the coatings comprise a rough ink adapted to scatter light. In some implementations, one or more of the coatings are applied via vapor deposition. In some implementations, one or more of the coatings are applied via thin film deposition. In some implementations, one or more of the coatings are applied via a pattern printing process. In some implementations, one or more of the coatings are applied via a spray-on process.

FIG. 8B shows the IR reflector 742 with cavities 802 for directing light from the IR illuminators 752. In some implementations, the IR reflector 742 is adapted to improve efficiency of the IR illuminators 752. The IR reflector 742 is particularly important when using IR illuminators having a wavelength that is not optimal for the image sensor, since more intensity is needed in order to illuminate the scene for the image sensor. In some implementations, the IR reflector 742 is adapted to prevent hot spots in the scene due to overlapping illumination from multiple IR illuminators. In some implementations, the IR reflector 742 is adapted to direct and/or restrict the illumination from the IR illuminators to the portion of a scene captured by the image sensor. For example, when the image sensor is adapted to capture a 16:9 rectangular portion of the scene the IR reflector 742 is adapted to provide substantially uniform illumination in that portion and substantially no illumination outside of that portion. In some implementations, the cavities 802 are shaped and/or positioned so as to provide substantially uniform illumination in that portion and substantially no illumination outside of that portion. In some implementations, the cavities 802 are shaped and/or positioned so as to minimize overlap between IR illuminators. In some implementations, the IR reflector 742 is composed of a material that reflects at least some wavelengths of IR light (e.g., 850 nm and/or 940 nm light). For example, the IR reflector 742 is composed of gold or a gold alloy.

In some implementations, the camera 118 includes a plurality of IR reflectors, each corresponding to particular IR illuminators. For example, the camera 118 includes four IR illuminators and two IR reflectors, where the first IR reflector is for directing light from the first two IR illuminators and the second IR reflector is for directing light from the second two IR illuminators. In some implementations, the multiple IR reflectors are configured such that the IR illumination from IR illuminators corresponding to the multiple IR reflectors is directed to provide substantially uniform illumination in a portion of a scene corresponding to the camera's field of view, and substantially no illumination outside of that portion. In some implementations, the camera's image sensor is adapted to capture wide angle images (e.g., a fisheye view). In some implementations, the IR reflector(s) are configured to provide substantially uniform illumination over the wide angle field of view, with substantially no illumination outside of that field of view.

In some implementations, the image sensor is configured to capture IR light (e.g., IR light having a wavelength of 940 nm or 850 nm). In some implementations, the IR light is converted (e.g., at the camera 118) to white light for display to a user. In some implementations, the IR illuminators 752 consist of two IR LEDs. In some implementations, the wavelength of the IR illuminators 752 is adjusted to be further from the visible spectrum. For example, the wavelength of the IR illuminators is adjusted to 940 nm rather than 850 nm. Adjusting the IR illuminators to be further from the visible spectrum of light means that the IR illumination from the illuminators is less visible (or invisible) to the human eye. In some implementations, the image sensor is tuned to 850 nm IR light, rather than 940 nm IR light. In some implementations, the IR illuminators are configured to emit 940 nm light and operate with increased power (e.g., double the power) to provide similar illumination to the image sensor (e.g., an image sensor tuned for 850 nm IR light) as would be provided by IR illuminators configured to emit at 850 nm. Therefore it is important that the IR illuminators are used as efficiently as possible. For example, the IR illuminators are configured to only illuminate the portion of the scene that is captured by the image sensor.

In some implementations, the image sensor has a rectangular field of view corresponding to +/−32 degrees vertical and +/−56 horizontal. In some implementations, the IR illuminators 752 are configured to emit light in a hemispherical pattern. Therefore, there is a need to direct and shape the light from the IR illuminators to illuminate the image sensor's field of view, while minimizing illumination outside of the field of view and overlap between IR illuminators causing hot spots in the sensed image.

In some implementations, the IR reflector 742 is configured to direct and shape the light from the IR illuminators to illuminate the image sensor's field of view, while minimizing illumination outside of the field of view and overlap between IR illuminators causing hot spots in the sensed image. In some implementations, the IR reflector 742 is composed of plastic and/or metal. In some implementations, the IR reflector 742 is coated with an IR reflective coating (e.g., silver). In some implementations, the IR reflector 742 is adapted to reflect substantially all IR light (e.g., 95%, 98%, 99% of IR light is reflected). In some implementations, the IR reflector 742 includes a rectangular cavity 802 for each IR illuminator 752. In some implementations, the rectangular cavities 802 are each configured to shape the IR light from the IR illuminators to correspond to the field of view of the camera 118 (e.g., of an image sensor of the camera 118). In some implementations, each cavity 802 includes an opening for the corresponding IR illuminator 752. In some implementations, the cavities 802 and illuminators 752 are positioned to minimize overlap in illumination between the IR illuminators 752. In some implementations, the cavities 802 are positioned such that illumination from the IR illuminators 752 is substantially uniform across the field of view of the image sensor. In some implementations, the cavities 802 are positioned so as to provide increased illumination (e.g., 1.2, 1.5, or 2 times the illumination) in the center of the field of view of the camera.

In some implementations, the IR reflector 742 is configured to restrict illumination from the IR illuminators to only illuminate the field of view of the camera. In some implementations, the IR reflector 742 is configured to optimize energy distribution from the IR illuminators in the field of view of the camera. In some implementations, the IR reflector 742 is configured to maximize the energy from the IR illuminators within the field of view of the image sensor while minimizing the energy wasted outside of the image sensor's field of view. In some implementations, the IR reflector is configured to shape the illumination from the IR illuminators such that the field of view of the camera is uniformly illuminated and areas outside of the field of view of the camera are not illuminated.

FIG. 8C illustrates several components of the camera 118 in accordance with some implementations. FIG. 8C shows the image sensor assembly 732 seated within the fryer basket 724, the IR reflector 742 affixed to the light ring 748, heat spreaders 810 that operate to transfer heat from the fryer basket 724 and image sensor assembly 732 to the cover element 704, and microphones 816 corresponding to apertures 706. In some implementations, the heat spreaders 810 are affixed to cover element 704. In some implementations, the heat spreaders 810 are adapted to substantially prohibit heat from affecting the images captured by the image sensor by redirecting heat away from the image sensor assembly 732 and toward the cover element 704 for emission outside the front face of the camera.

Figure 9:
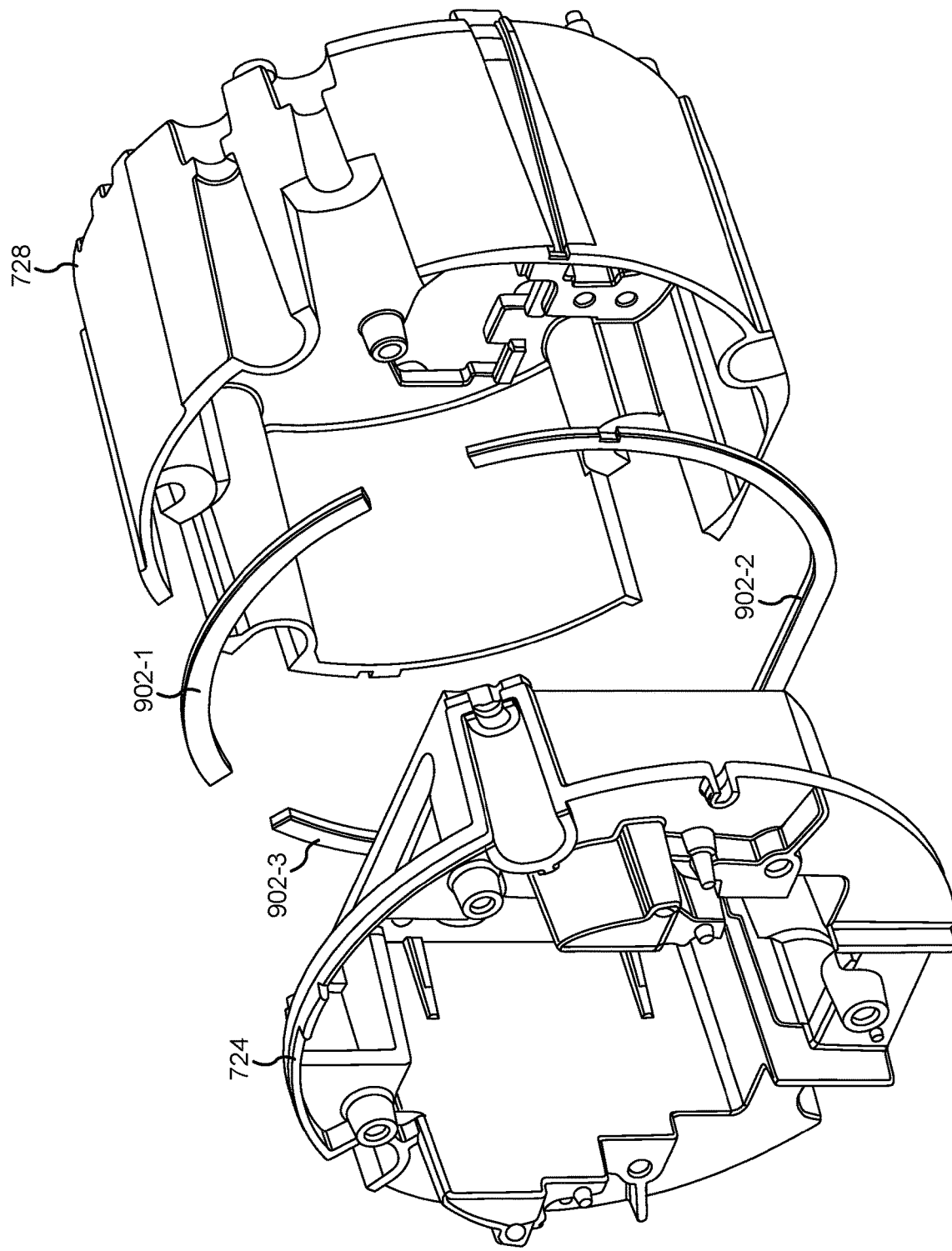
FIG. 9 is a component view illustrating a representative camera assembly in accordance with some implementations.

FIG. 9 illustrates an expanded view of several components of the camera 118 in accordance with some implementations. FIG. 9 shows the fryer basket 724, thermal insulators 902, and the fryer pot 728. In some implementations, the thermal insulators 902 are adapted to substantially thermally isolate the fryer basket 724 from the fryer pot 728.

Figure 10A:
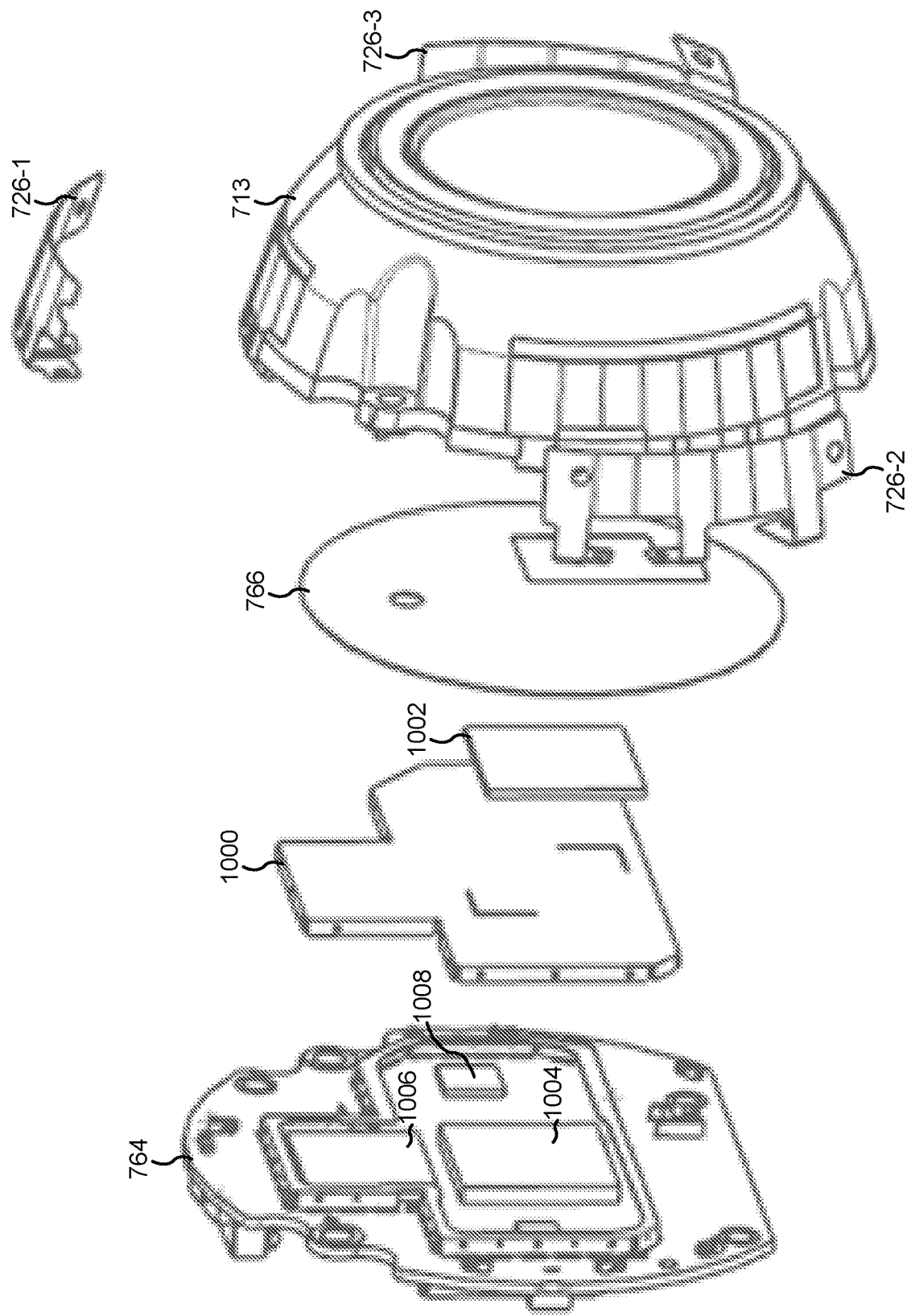
FIGS. 10A-10C are component views illustrating a representative camera assembly in accordance with some implementations.
Figure 10B:
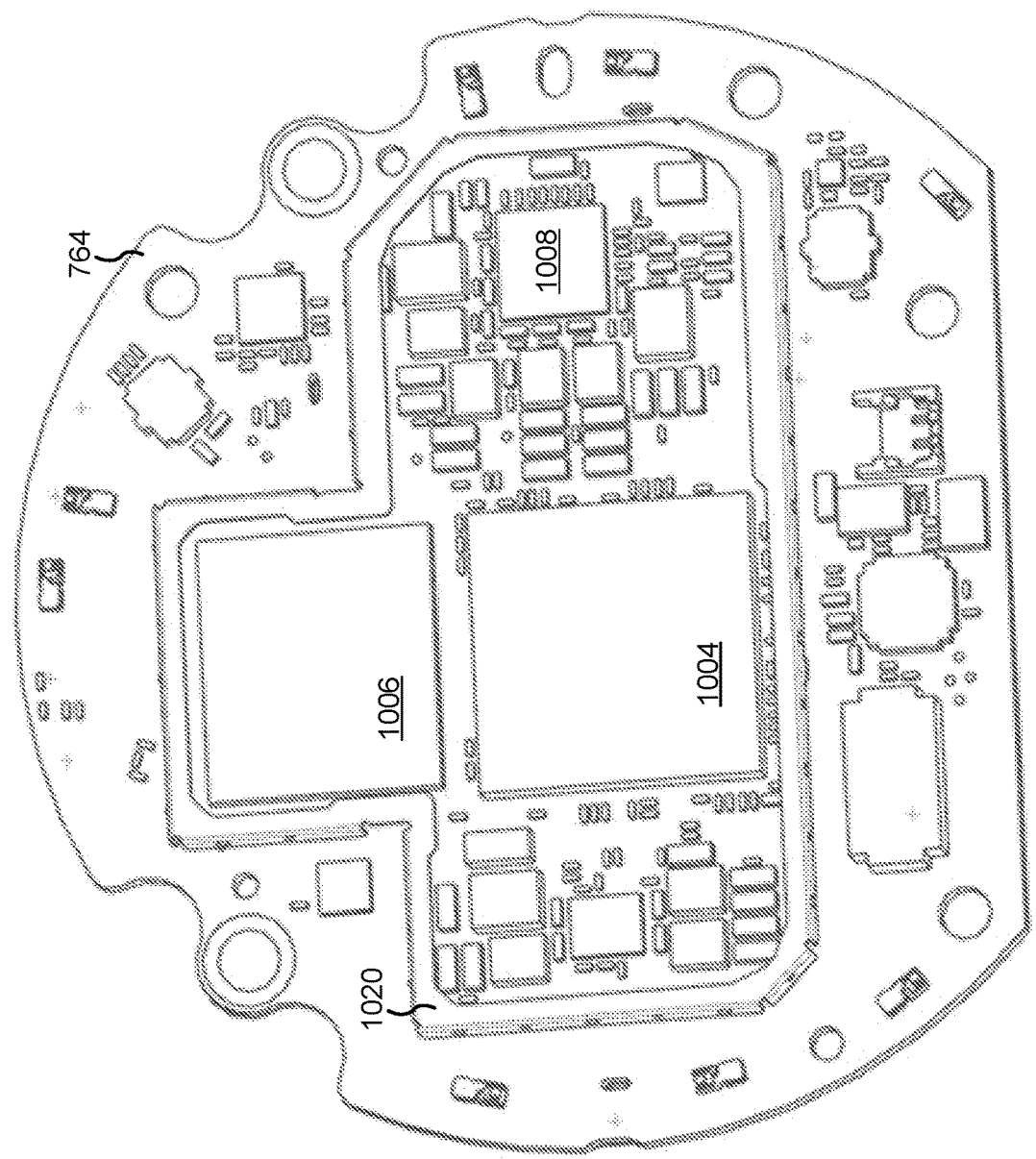
Figure 10C:
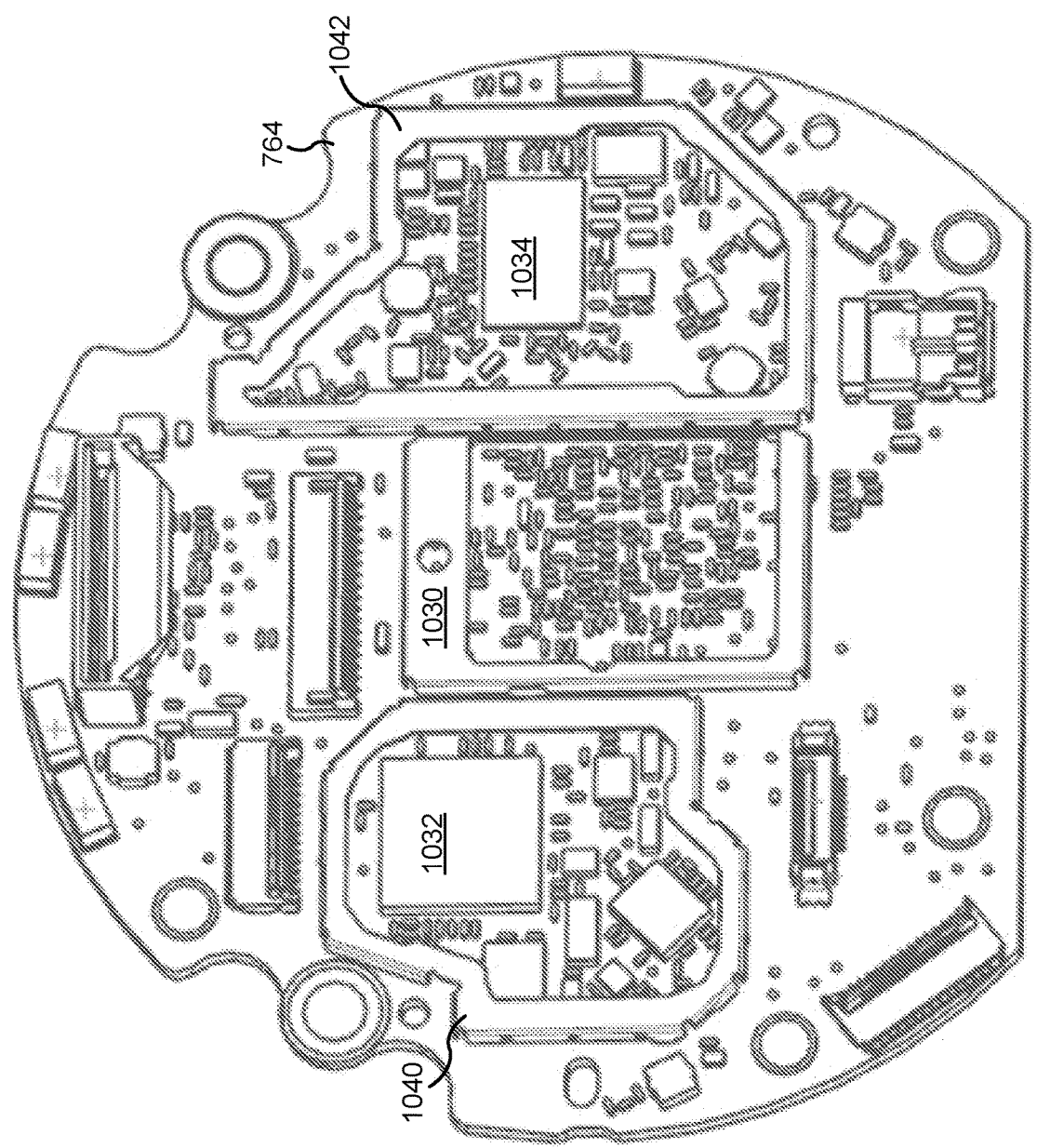

FIGS. 10A-10C are component views illustrating a representative camera assembly in accordance with some implementations. FIG. 10A shows the main board 764, an electromagnetic (EMI) shielding 1000, a thermal pad 1002, the thermally conductive sheet 766, the speaker assembly 713, and the antennas 726. As shown in FIG. 10A the main board 764 includes a system-on-chip (SoC) 1004, a memory chip 1006 (e.g., including memory and a memory controller), and a power management integrated circuit (PMIC) 1008. In some implementations, the thermally conductive sheet 766 comprises a graphite sheet. In some implementations, the EMI shielding 1000 is composed of aluminum, stainless steel, and/or an aluminum alloy. In some implementations, the thermal pad 1002 is positioned to lay over the top of the SoC 1004. In some implementations, the thermal pad 1002 is sized to correspond to the SoC 1004. In some implementations, the thermal pad 1002 is sized to correspond to the EMI shielding 1000.

In some implementations, the back of the main board 764 is thermally coupled to the speaker assembly 713 for heat transfer and dissipation (e.g., via the EMI shielding 1000, the thermal pad 1002, and the conductive sheet 766). In some implementations, the front of the main board 764 is thermally coupled to the fryer pot 728 for heat transfer and dissipation (e.g., via EMI shielding on the front of the board).

FIG. 10B shows the back of the main board 764 with the SoC 1004, the memory controller 1006, and an electromagnetic interference (EMI) fence 1020. In some implementations, the EMI fence 1020, in conjunction with the EMI shielding 1000, is adapted to substantially prevent electromagnetic interference with the SoC 1004 and/or the memory controller 1006 from outside sources. In some implementations, the top of the SoC 1004 and/or the memory chip 1006 is coated with a thermal substance (e.g., a putty or paste) to dissipate heat from the SoC 1004. In some implementations, the thermal substance is in contact with the EMI shielding 1000 after the EMI shielding 1000 is affixed to the EMI fencing 1020. Thus, the thermal substance transfers heat from the corresponding component (e.g., the SoC 1004) to the EMI shielding (e.g., EMI shielding 1000).

In some instances, placing a graphite sheet 766 on the bottom surface of the speaker assembly will impact operation of the antenna systems 726. In some instances and implementations, the antenna efficiency for the antennas 726 is impacted when the graphite sheet is placed on top of an EMI shield. In some instances and implementations, the antenna efficiency significantly degrades when the graphite sheet 766 is attached on the bottom surface of the speaker assembly 713. This is due, at least in part, to the increased coupling between each antenna when the graphite sheet is on the speaker assembly 713 bottom surface. The increased coupling may cause not only the efficiency degradation, but also permanent damage to the chipset. In some implementations, a small cut is created near the center of the graphite sheet 766 (e.g., separating the graphite sheet into two pieces). In some implementations, the location of the cut is chosen so each piece of the graphite sheet can still make contact to the thermal pad 1002. In some implementations, the width of the cut is minimized to have maximum graphite surface area and make maximum contact to the thermal pad. In some implementations, the cut breaks the coupling channel between each antenna 726, thus increasing the isolation between each antenna. The good isolation restores the efficiency for each antenna. In some implementations, both graphite sheet pieces are overlapped with the thermal pad which is placed on SoC hot spot. In this arrangement, the heat is still well distributed throughout the entire graphite sheet. In some implementations, the graphite sheet 766 includes two cuts, thereby having 3 pieces corresponding to 3 antennas 726. In some implementations, the graphite sheet has N cuts, corresponding to N+1 antennas. Thus, for a camera assembly having five antennas the graphite sheet has four cuts so as to minimize interference between the antennas while still transferring heat from the thermal pad 1002 to the speaker assembly 713.

FIG. 10C shows the front of the main board 764 with radios 1032 and 1034. In some implementations, the radio 1032 and/or the radio 1034 is configured for broadband (e.g., Wi-Fi, cellular, etc.) communications. In some implementations, the radio 1032 and/or the radio 1034 is configured for point-to-point (e.g., Bluetooth) communications. In some implementations, the radio 1032 and/or the radio 1034 is configured for mesh networking (e.g., Thread, Zigbee, ZWave, IEEE 15.4, etc.) communications. The radios 1032 and 1034 are coupled to the antennas (e.g., antennas 726-1 and 726-2). FIG. 10C also shows EMI fencing 1030, EMI fencing 1040 around the radio 1032, and EMI fencing 1042 around the radio 1034. In some implementations, the EMI fencing (e.g., EMI fencing 1030, 1040, and/or 1042) is configured to minimize electromagnetic interference (e.g., from outside sources or between various components such as between the radios 1032 and 1034). In some implementations, the EMI fencing (e.g., EMI fencing 1030, 1040, and/or 1042) is configured to substantially isolate the corresponding electrical components from sources outside of the EMI fencing. In some implementations, the camera 118 also includes EMI shielding corresponding to each EMI fencing shown in FIG. 10C. In some implementations, the EMI shielding is adapted to transfer heat from the main board 764 to the fryer pot 728. In some implementations, the EMI fencing (e.g., EMI fencing 1020, 1030, 1040, and/or 1042) is composed of aluminum and/or an aluminum alloy. In some implementations, the EMI shielding (e.g., EMI shielding 1000) is configured to affix (e.g., snap) to the corresponding EMI fencing (e.g., EMI fencing 1020).

In some implementations, the main board 764 also includes a connector for communicatively coupling the main board 764 to the light ring 748, a connector for communicatively coupling the main board 764 to the image sensor assembly 732, a connector for communicatively coupling the main board 764 to the cable 714, a connector for communicatively coupling the main board 764 to the speaker assembly 713, and/or connectors for communicatively coupling the main board 764 to the antennas 726 (e.g., communicatively coupling the radios 1034 and 1032 to the antennas 726). In some implementations, the connector for communicatively coupling the main board 764 to the image sensor assembly 732 comprises a flex connector. In some implementations, the connectors for communicatively coupling the main board 764 to the antennas 726 comprise spring connectors (e.g., spring finger connectors).

Figure 11:
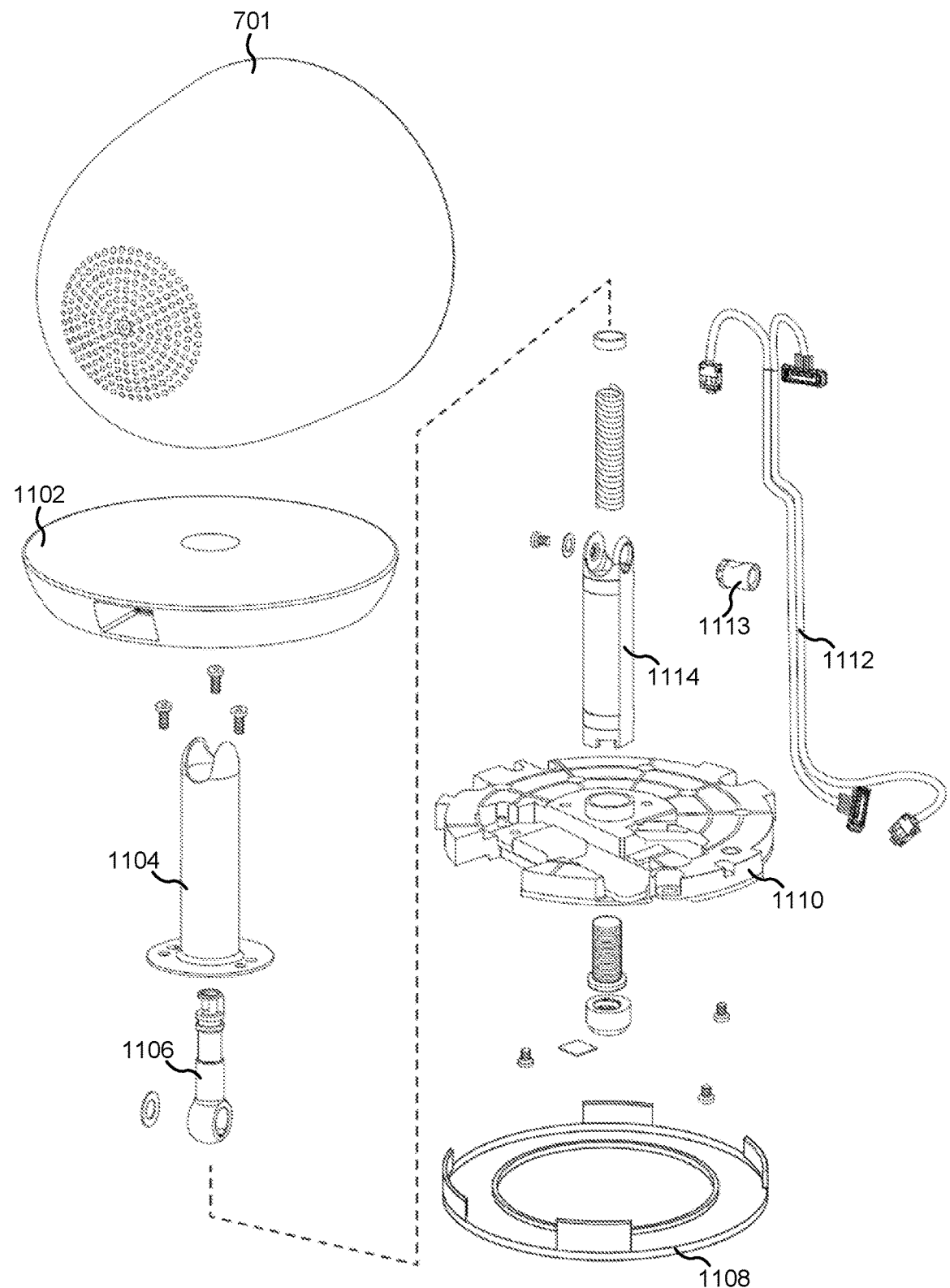
FIG. 11 is a component view illustrating a representative camera assembly in accordance with some implementations.

FIG. 11 is a component view illustrating a representative camera assembly in accordance with some implementations. As shown in FIG. 11, in some implementations, the camera 118 includes one or more interconnect wires 1112 which may be separated into a first cable bundle and a second cable bundle. For example, in some implementations, the first cable bundle is configured to transmit power and the second cable bundle is configured to transmit data signals (e.g., video data, audio data, etc.). Each cable bundle may have at their ends appropriate connectors (e.g., wire-to-board connectors) for electrically connecting to electronic circuitry housed in the stand assembly 702 (sometimes also called a base assembly) and the head assembly 703. In some implementations, interconnect wires 1112 are provided with first connectors at a first end for connecting to electronic circuity of the electronic device of in head assembly and second connectors at a second end for connecting to one or more PCBs (e.g., mounted on the foundation 1110) housed in stand assembly. In some implementations, the cable bundles are separated from each other at their ends while a middle portion is physically joined. In some implementations, the cable bundles are at least partially wrapped with a protective layer, for example, acetate tape.

In some implementations, the one or more interconnect wires 1112 include a first wire portion that is routed through an interior of neck portion 1106, a second wire portion that is routed along a surface of the spine portion 1114 into the base portion 1102, and a third wire portion that is routed though the joint structure from the surface of the spine portion 1114 to the interior of the neck portion 1106. In some implementations, each of the first wire portion and the second wire portion is angled (e.g., obliquely or orthogonally) relative to the third wire portion. In some implementations, the first wire portion extends from connectors for connecting to circuitry within head assembly through a second opening at first end of the neck portion 1106 and into the lumen of neck portion 1106. In some implementations, the first wire portion further extends through an opening and into an interior of the pivot 1113. The first wire portion, in some implementations, transitions to the third wire portion at a first bend within the pivot 1113. In some implementations, the first bend includes a bend of about 80 degrees to about 100 degree between the first wire portion and the third wire portion, for example, about 90 degrees. In some implementations, the third wire portion extends out of pivot 1113 through an open first end and through an opening of a flange of the spine portion 1114. In some implementations, the third wire portion transitions to the second wire portion at a second bend. In some implementations, the first bend includes a bend of about 80 degrees to about 100 degree between the third wire portion and second wire portion, for example, about 90 degrees. In some implementations, the second wire portion extends from the second bend along an exterior surface of the spine portion 1114 and into the base portion 1102. In some implementations, second wire portion 480b is at least partially disposed within the clearance formed between exterior surface 476 and an interior surface of stem cover 470. In some implementations, the second wire portion extends into the base portion 1102 through a gap between the flange of the stem cover 1104 and the foundation 1110. In some implementations, the second wire portion terminates at connectors which are configured to couple with PCB(s) housed in base portion 1102 and electrically couple with electronic connector 714. In some implementations, the foundation 1110 is provided with grooves or channels to direct he second wire portion to the PCB(s). In some implementations, the one or more interconnect wires 1112 have different cross-sectional shapes at different portions of the one or more interconnect wires. For example, in some implementations, the one or more interconnect wires are bundled at a second wire portion to have a generally flattened cross-section shape to better fit within the clearance between the external surface of the spine portion 1114 and the stem cover 1104. In further implementations, the one or more interconnect wires 1112 are bundled to have a round cross-sectional shape at a first portion through the neck portion 1106 and/or a third portion through the pivot 1113.

The positioning of the first, second, and third wire portions according to some implementations allows for a greater degree of motion of the neck portion 1106 with respect to the spine portion 1104. In some implementations, the positioning of the first, second, and third wire portions allows the neck portion 1106 to pivot with respect to spine portion 1104 throughout its full range of motion without requiring substantial slack in the one or more wires. In some implementations, the third wire portion does not substantially move with respect to the spine portion 1104 when the neck portion 1106 is pivoted with respect to the spine portion 1104. In some implementations, the first wire portion bends with respect to the third wire portion when the neck portion 1106 is pivoted with respect to the spine portion 1104. In further implementations, the positioning of the first, second, and third wire portions is configured to completely conceal the one or more wires 1112 such that no portion of the one or more wires 1112 is visible outside of the head assembly 703, the stem portion 1104, and the base portion 1102.

In some implementations, the base cover includes a top portion 1102 which includes a top surface and a bottom portion 1108 which includes a bottom surface. In some implementations, the top portion further includes an open cavity which defines a port and provides access to the electronic connector 714 positioned within base portion. In some implementations the foundation 1110 and the other internal components of the base portion are sandwiched between the top portion 1102 and the bottom portion 1108 of the base cover. The top portion and the bottom portion, in some implementations, are made from metal, rigid plastic, or other sturdy materials. In some implementations, the camera 118 is configured to be rotated +/−90 degrees in the horizontal and +/−90 degrees in the vertical.

Although the implementations are described as including particular numbers of components (e.g., 3 microphones, 3 antennas, 2 IR illuminators, etc.), these numbers are not intended to be limiting. The number of these components is optionally varied, from zero or one to many (e.g., 4, 6, or 10) in different implementations, as would be apparent to one skilled in the art based on technical, aesthetic, and/or budgetary requirements and/or preferences.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A video camera assembly, comprising:
    one or more processors configured to operate the video camera assembly in a day mode and in a night mode;
    an image sensor having a field of view of a scene and configured to capture video of a first portion of the scene while in the day mode of operation and in the night mode of operation, the first portion corresponding to the field of view of the image sensor;
    one or more infrared (IR) illuminators configured to provide illumination during the night mode of operation while the image sensor captures video; and
    an IR reflector component configured to: (i) substantially restrict the illumination onto the first portion of the scene, and (ii) illuminate the first portion in a substantially uniform manner across the field of view of the image sensor.

2. The video camera assembly of claim 1, further comprising an ambient light sensor configured to detect ambient light corresponding to the scene;
    wherein the one or more IR illuminators are configured to selectively provide illumination based at least in part on data from the ambient light sensor.

3. The video camera assembly of claim 1, wherein the one or more IR illuminators comprise two or more IR illuminators; and
    wherein the IR reflector component is configured to minimize overlap of illumination between the two or more IR illuminators.

4. The video camera assembly of claim 1, wherein the IR reflector component is further configured to substantially prohibit light from the one or more IR illuminators from entering the image sensor prior to interacting with the first portion of the scene.

5. The video camera assembly of claim 1, wherein the one or more IR illuminators are configured to emit IR light of a particular frequency;
    wherein the image sensor is not optimized to capture IR light of the particular frequency; and
    wherein the IR reflector component is configured to maximize an amount of IR light captured by the image sensor from the one or more IR illuminators during the night mode of operation.

6. The video camera assembly of claim 1, further comprising a cover glass positioned in front of the image sensor, the one or more IR illuminators, and the IR reflector, such that light from the IR illuminators is directed through the cover glass and light from the scene passes through the cover glass prior to entering the image sensor.

7. The video camera assembly of claim 1, wherein the one or more IR illuminators comprise one or more IR light-emitting diodes (LEDs).

8. The video camera assembly of claim 1, further comprising:
    a plurality of visible light illuminators configured to convey information to a user of the camera assembly; and
    a visible light reflector component configured to direct illumination from the visible light illuminators.

9. The video camera assembly of claim 1, wherein the one or more processors are further configured to:
    govern operation of the image sensor and the one or more IR illuminators; and
    analyze image data captured by the image sensor.

10. The video camera assembly of claim 1, wherein the one or more processors are further configured to recognize objects and entities in the image data.

11. The video camera assembly of claim 1, further comprising:
    communication circuitry including one or more transceivers configured for communication over a first communication protocol and a second communication protocol;
    a first antenna configured for communication over the first communication protocol; and a second antenna configured for communication over the second communication protocol.

12. The video camera assembly of claim 11, wherein video data captured by the image sensor is exchanged between the camera assembly and a server via the communication circuitry and the first antenna.

13. The video camera assembly of claim 11, wherein the first communication protocol is in accordance with the IEEE 802.11 specifications, and wherein the second communication protocol is in accordance with the IEEE 802.15.4 standard.

14. The video camera assembly of claim 1, further comprising:
   one or more speakers configured to convey information to a user of the camera assembly; and
   one or more microphones configured to capture audio data.

15. The video camera assembly of claim 1, further comprising a single-piece cover element positioned in front of the image sensor and the one or more IR illuminators such that light from the one or more IR illuminators is directed through the cover element and light from the scene passes through the cover element prior to entering the image sensor, the cover element including:
   a first portion corresponding to the image sensor, the first portion substantially transparent to visible light and IR light;
   a second portion corresponding to the one or more IR illuminators, the second portion coated to be substantially transparent to IR light; and
   a third portion between the first portion and the second portion, the third portion coated to be substantially opaque to IR and visible light.

16. The video camera assembly of claim 1, wherein the IR reflector component is configured to substantially restrict the IR illumination onto the first portion of the scene by directing the IR illumination onto the first portion of the scene.

17. The video camera assembly of claim 1, wherein the IR reflector component is configured to substantially restrict the IR illumination onto the first portion of the scene by shaping the IR illumination to illuminate the first portion of the scene while minimizing IR illumination outside of the first portion of the scene.

18. The video camera assembly of claim 1, wherein the IR reflector component is configured to substantially restrict the IR illumination onto the first portion of the scene by restricting the IR illumination to only illuminate the first portion of the scene.

19. The video camera assembly of claim 1, wherein:
   the IR reflector component includes a cavity for each IR illuminator;
   each cavity includes an opening for a corresponding IR illuminator; and
   each cavity is configured to shape the IR illumination to correspond to the first portion of the scene.

20. The video camera assembly of claim 1, wherein the IR reflector component is configured to shape the IR illumination from the IR illuminators such that the field of view of the image sensor is uniformly illuminated and areas outside of the field of view of the image sensor are not illuminated.

* * * * *